United States Patent [19]
Smith et al.

[11] Patent Number: 5,870,138
[45] Date of Patent: Feb. 9, 1999

[54] FACIAL IMAGE PROCESSING

[75] Inventors: Anthony Smith; Hiroshi Sako; Alistair Sutherland; Masahiro Abe, all of Dublin, Ireland

[73] Assignee: Hitachi, Ltd., Tokyo, Japan

[21] Appl. No.: 615,360

[22] Filed: Mar. 14, 1996

[30] Foreign Application Priority Data

Mar. 31, 1995 [EP] European Pat. Off. .............. 95650009
Mar. 31, 1995 [EP] European Pat. Off. .............. 95650010

[51] Int. Cl.$^6$ ................................ H04N 7/18; H04N 9/47
[52] U.S. Cl. .......................... 348/143; 348/169; 348/578
[58] Field of Search .............................. 348/17, 152, 169, 348/578; 382/118, 100, 254, 286, 276, 103; 345/435

[56] References Cited

U.S. PATENT DOCUMENTS

| | | | |
|---|---|---|---|
| 4,600,281 | 7/1986 | Bloomstein | 352/50 |
| 5,410,609 | 4/1995 | Kado et al. | 382/2 |
| 5,642,431 | 6/1997 | Poggio et al. | 382/118 |

FOREIGN PATENT DOCUMENTS

| | | |
|---|---|---|
| 63-142986 | 6/1988 | Japan . |
| 2-141880 | 5/1990 | Japan . |

OTHER PUBLICATIONS

ACCV '93 Asian Conference on Computer Vision, Nov. 23–25, Osaka, Japan, pp. 763–766; Osamu Hasegawa et al.: Realtime Facial Image Recognition in Unconstrained Environment for Interactive Visual Interface.

Heriot–Watt University, UK, J.F.S. Yau & N.D. Duffy: A Feature Tracking Method for Motion Parameter Estimation in a Model–Based Coding Application, pp. 531–535.

Biological Cybernetics, vol. 70, 1993, Heidelberg, DE, pp. 137–144; L. Bowns et al.: Facial features and axis of symmetry extracted using natural orientation information.

Electronics and Communications in Japan, Part I–Communications, vol. 76, No. 9, 1993, New York, US, pp. 9–20, Yuukou Horita: Region Segmentation Coding of Color Images Based on Uniform HVC Color Space.

Primary Examiner—Wendy Garber
Assistant Examiner—Christopher Onuaku
Attorney, Agent, or Firm—Kenyon & Kenyon

[57] ABSTRACT

A camera (10) captures a subject facial image. A unit (30) generates a tracking signal containing feature extraction data. In conjunction with a memory store (40), the unit (30) generates an output signal representing a substitute face having the features of the subject face. To generate the tracking signal, the facial area is detected (3103, 3107–8) initially and used in location of the mouth (3102, 3110–3114) and eyes (3104–6, 3115–3118). Only the H and S components are used for detecting the facial area; and only the S and V components for the mouth within the facial area. A face vector may be generated (50) using the tracking signals.

39 Claims, 13 Drawing Sheets

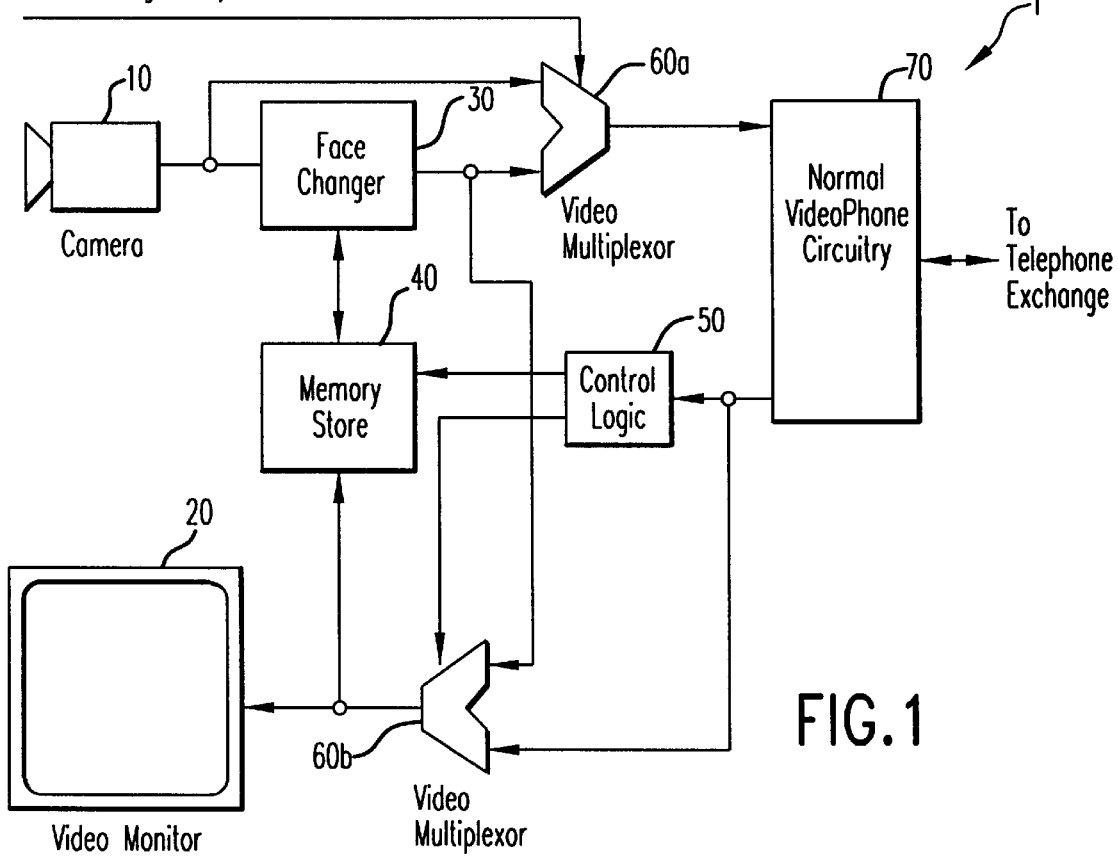
FIG.1
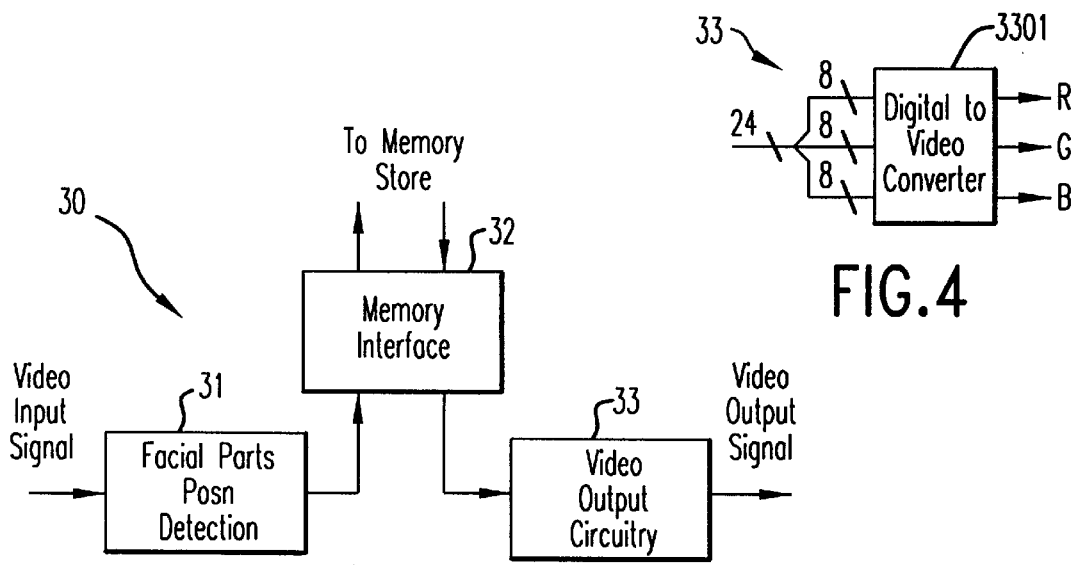
FIG.2
FIG.4

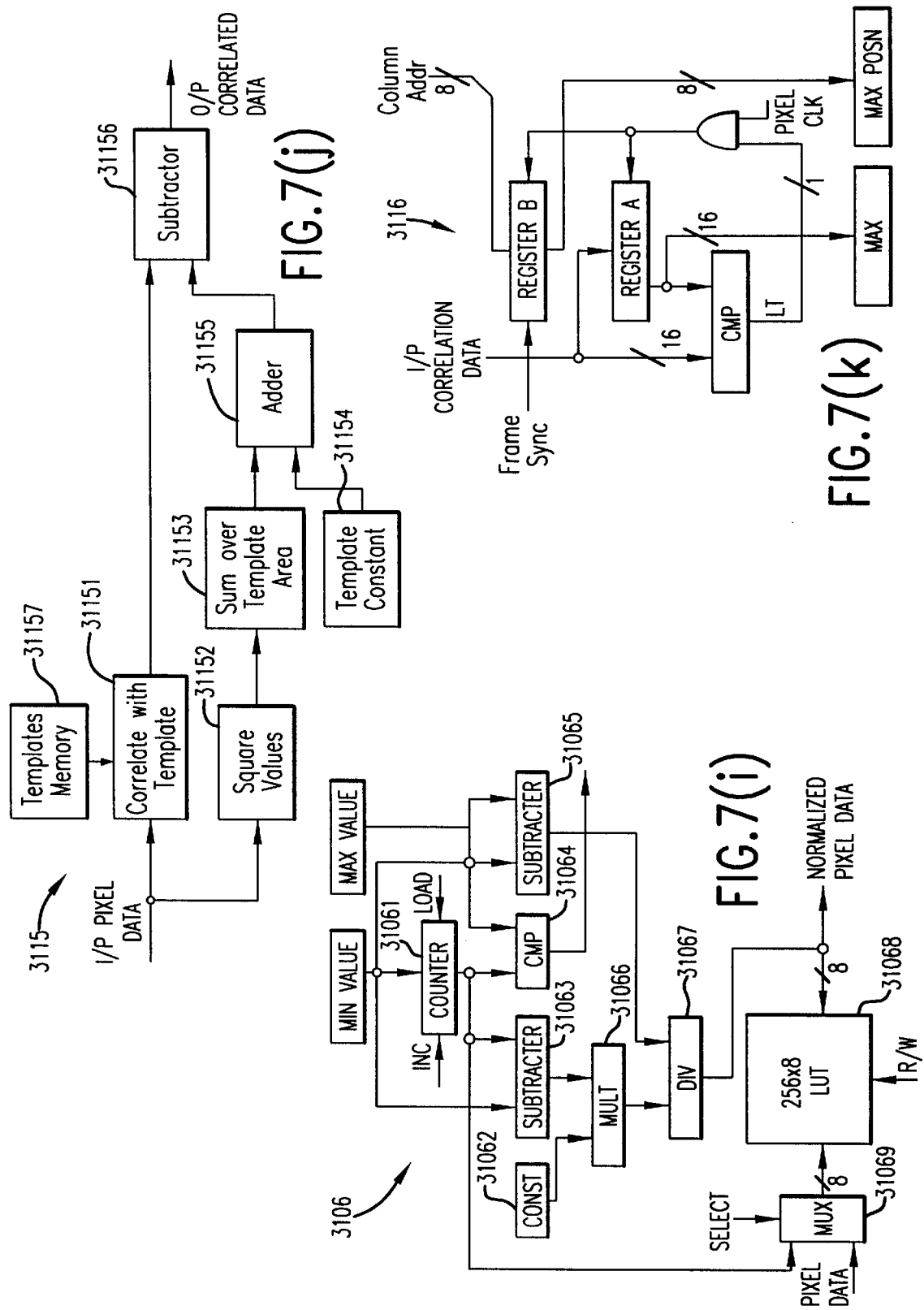

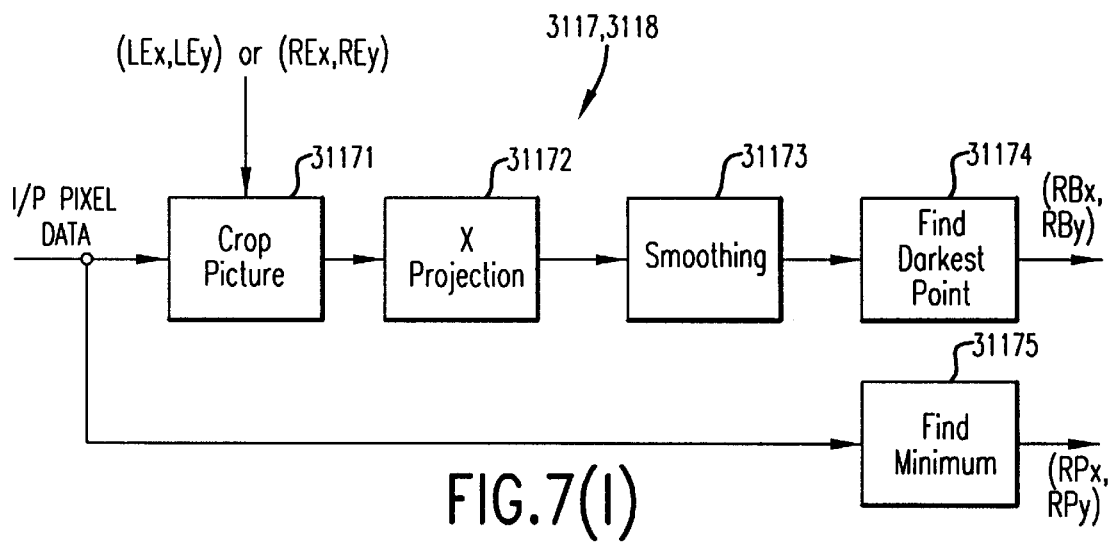
FIG.7(l)
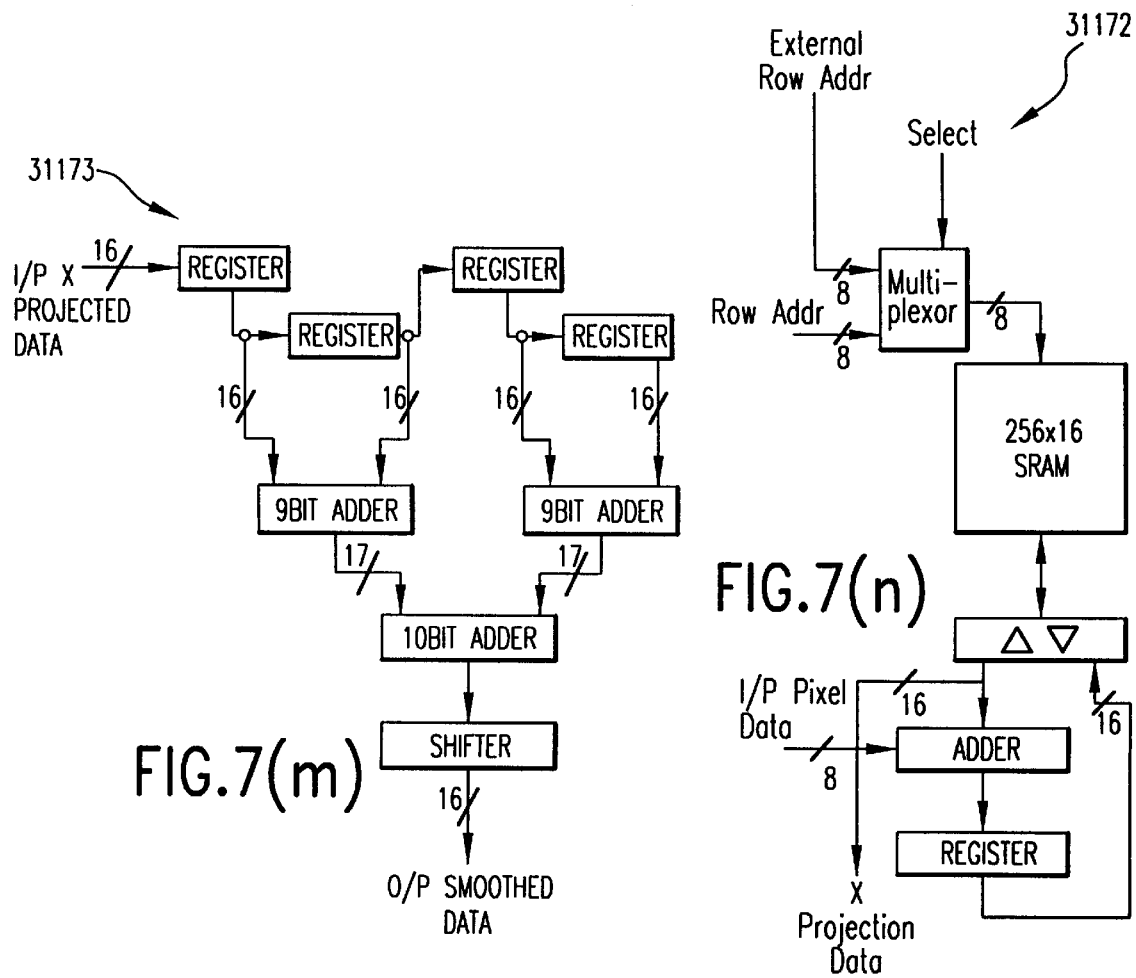
FIG.7(m)
FIG.7(n)

FACIAL IMAGE PROCESSING

FIELD OF THE INVENTION

The invention relates to an image processing method and apparatus and more particularly to a method and apparatus which can receive a subject facial image signal, generate a feature extraction tracking signal representing locations of facial features of the subject and provide an output signal.

PRIOR ART DISCUSSION

In the paper "Realtime Facial Image Recognition in Unconstrained Environment for Interactive Visual Interface" by Hasegawa et al published in ACCV '93 Asian Conference on Computer vision, November 23–25, Osaka, Japan pp. 763–766 a system is outlined in which features such as the eyes and the nose are extracted as edges. The tracking signal may be processed for integration of facial features or for monitoring eye contact. Because feature extraction involves monitoring feature edges, the amount of useful information would appear to be limited. Little technical information is given in the paper to describe how the system operates. However, it is mentioned that RGB color information is calculated. The use of RGB color information generally leads to high complexity in the image processing circuits.

The paper by J.F.S. Yau and N.D. Duffy entitled "A Feature Tracking Method for Motion Parameter Estimation in a Model-Based Coding Application" presented at the Third International Conference on Image Processing and its Applications held at Warick on 18–20th Jul. 1989 and published in IEE Conference Publication No. 307' at pages 531 to 535 describes a method of tracking a face. In this method, there is a first phase which involves tracking the eye, nose and mouth over the image sequence. This is achieved by locating the facial features within the first frame and then tracking them over subsequent frames using block searching and code-book techniques. The result of the first tracking phase is a description of the trajectory of facial feature boxes over the image sequence along the temporal axis. There is then a second phase which involves motion parameter estimation whereby the spatial distribution of the facial feature boxes for each frame are interpreted to provide an estimate of position and orientation. In this way, the dynamics of facial movement are parameterized for application in a three-dimensional model-based image coding scheme.

The output signal represents a facial image having feature extraction information. It appears that this prior method is intolerant to occlusion as once tracking of a feature is lost it has difficulty re-locating it. Further, processing must of necessity be complex as the inter-relationship of boxes is analyzed on a frame-by-frame basis.

Japanese Patent Specification No. JP 02141880 (Graphic Communication Technologies) describes a system whereby an image signal is divided into a grid of regions and there is analysis of each region separately. The evaluation is performed on a single image and does not involve processing from frame to frame and the purpose of the system is to discriminate a face in an image.

Japanese Patent Specification No. JP 63142986 (NEC) describes a system which detects the facial area of an image according to detection of mouth movement. A suggested application for the system is that of obtaining the image of a face and overlaying it upon a picture of clean clothing. Accordingly, there is limited feature extraction in these systems, and also therefore little versatility.

In general, it could be said that the prior art shows limited feature extraction, and very limited ranges of post-extraction processing for different applications.

OBJECTS OF THE INVENTION

One object of the invention is to provide a method and apparatus to output a tracking signal which is of more benefit for down-stream processing with a wider range of applications.

The invention is also directed towards providing a method and apparatus which provides additional processing of the image signals to obtain more useful outputs for improved versatility. Another object is that these outputs be achieved in real time.

A still further object is to limit the complexity of hardware required for carrying out the image processing method.

SUMMARY OF THE INVENTION

The invention provides an image processing method comprising the steps of receiving a subject facial image signal, generating a feature extraction tracking signal, and processing said tracking signal to provide a processed output signal, wherein:

said processing step comprises the sub-steps of:
  generating an image signal representing a substitute face; and
  modifying said substitute face image signal in real time according to the tracking signal to generate an output signal representing the substitute face with facial features of the subject face.

This processing method provides a large degree of versatility. A real substitute facial signal may be generated to "fool" the viewer, for example, for security applications. Alternatively, an animated face may be generated, for example, for cinema productions.

In one embodiment, the output signal is transmitted from an output image memory which is modified by overwriting pixel values transferred from an update image memory in response to the tracking signal and preferably the update image memory stores pixel changes between frames.

In another embodiment, the update transfers are controlled by reference to a lookup table having pointers to addresses in the update image memory.

In a further embodiment, the tracking signal is converted to a facial characteristic signal representing positional characteristics of facial features, and preferably the facial characteristic signal is a vector signal, and preferably pixel change data in the update image memory is selected by comparison of current and previous characteristic signals. Ideally, the previous characteristic signal is stored in a dedicated register.

In a further embodiment, the update image memory stores data elements in three fields, namely an indicator of the position of the element, a second field having an address for a location in the output image memory and a third field having a color value for the pixel.

In another embodiment, the step of generating the substitute face image signal comprises the steps of retrieving from an image memory a primeval image and subsequently updating said image according to the tracking signal, and preferably the primeval image is transferred from a primeval image memory to the output image memory upon initialization.

In one embodiment, the tracking signal is generated by:
  generating a subject facial image signal in H,S,V format;
  passing at least two components of said H,S,V, format signal through a band pass filter;

mapping the filter output signals over the subject facial image pixel area; and determining feature locations within the pixel area according to the mapping of the filter output signals.

In this latter embodiment, the step of determining feature locations comprises the sub-steps of detecting the facial area and subsequently detecting mouth and eye areas within the detected facial area. Preferably, only the H and S components of the subject facial image signal are processed for facial area detection. In one embodiment, said processing comprises band pass filtering followed by mapping the filter output over the pixel area.

In another embodiment, mouth detection is achieved by processing the S and V components of the subject image signal within the detected facial area.

Preferably, only the V component of the subject image signal is processed for eye detection. In another embodiment, the V component is normalized and eye detection is achieved by correlation.

According to another aspect, the invention provides an image processing method comprising the steps of:

receiving a subject facial image signal;

extracting features in the signal to generate a tracking signal;

transforming the tracking signal to a facial characteristic signal representing positional characteristics of features of the subject face;

writing a primeval substitute image to an output image memory; and modifying the output image memory by overwriting pixel values transferred from an update image memory, said transfers being controlled in response to the facial characteristic signal.

According to a still further aspect, the invention provides an image processing apparatus comprising means for receiving a subject facial image signal, means for generating a feature extraction tracking signal, and means for processing said tracking signal to provide a processed output signal, characterized in that, said processing means comprises means for:

generating an image signal representing a substitute face; and modifying said substitute face image signal in real time according to the tracking signal to generate an output signal representing the substitute face with facial features of the subject face.

In one embodiment, said processing means comprises an output image memory, an update image memory and means for modifying said output image memory by transferring pixel values from the update image memory in response to the tracking signal.

Ideally, the update image memory stores pixel changes between frames.

In another embodiment, said processing means comprises means for converting the tracking signal to a facial characteristic signal representing positional characteristics of facial features.

In a further embodiment, said facial characteristic signal is a vector signal.

In a still further embodiment, the processing means further comprises a neural network device for training during operation of the apparatus by monitoring feature data and for subsequently providing feedback to assist in recognition of features.

In another aspect, the invention provides an image processing apparatus comprising:

means for receiving a subject facial image signal;

means for extracting features in the signal to generate a tracking signal; and processing means comprising:

means for transforming the tracking signal to a facial characteristic signal representing positional characteristics of features of the subject face;

an output image memory;

means for writing a primeval substitute image to the output image memory;

an update image memory; and means for modifying the output image memory by transferring pixel values from the update image memory to the output image memory in response to the facial characteristic signal.

According to a further aspect, the invention provides an image processing method comprising the steps of receiving an input image signal and generating a feature extraction tracking signal, characterized in that:

the input image signal is in H,S,V format;

a facial area location signal is generated by passing at least part of the input image signal through a band pass filter and analyzing the output of the filter;

a mouth location signal is generated by passing at least part of the input image signal through a band pass filter and analyzing the output of he filter within the facial pixel area according to the facial area location signal;

eye location signals are generated by processing at least part of the input image signal within the facial pixel area according to the facial area location signal; and the facial area location, mouth location and eye location signals are outputted as output tracking signals.

In one embodiment, only two of the H,S,V input image components are used for generation of the facial area location signal.

Preferably, the H and S components are passed through the band pass filter for generation of the facial area location signal.

In one embodiment, only two of the H,S,V input image components are used for generation of the mouth location signal.

Preferably, the S and V components are passed through the band pass filter for generation of the mouth area location signal.

In one embodiment, the band pass filter output signals are analysed by mapping the output data over the pixel area and generating a projection in a mapping axis and analyzing said projection, and preferably two projections are generated, one for each axis in a two-dimensional pixel area plane.

In another embodiment, each band pass filter comprises a look-up table containing filter indicators which are generated off-line.

Ideally, the step of analyzing the filter output signals comprises the further steps of determining maximum limits in the pixel area for a feature and generating a bounding box according to said limits.

In a further embodiment, the image processing for generation of the eye area location signals comprises the steps of correlation with template, and preferably the image signal is normalized before correlation.

In another embodiment, the V component only of the input image signal is used for generation of the eye location signals.

In a further embodiment, the tracking signals which are generated are post-processed to generate a facial characteristic signal representing both location and positional characteristic data, said signal being generated by passing the tracking signals through logic devices.

According to a still further aspect, the invention provides an image processing apparatus comprising:

means for receiving an input image signal in H,S,V format;

a facial area band pass filter;

means for passing at least part of the input image signal through the facial area band pass filter and analyzing the output of the filter to generate a facial area location signal;

a mouth location band pass filter;

means for passing at least part of the input image signal through the mouth location band pass filter and for analyzing the output of the filter within the face pixel area according to the facial area location signal;

processing means for processing at least part of the input image signal within the facial pixel area according to the facial area location signal to generate eye location signals; and means for outputting said facial area location, mouth location, and eye location signals as output tracking signals.

Preferably, only the H and S components of the input image signal are passed through the facial area band pass filter.

In one embodiment, only the S and V components of the input image signal are passed through the mouth location band pass filter.

In a further embodiment, the apparatus further comprises post-processing logic devices comprising means for receiving the tracking signals and generating a facial characteristic signal representing both location and positional characteristic data.

BRIEF DESCRIPTION OF THE DRAWINGS

The invention will be more clearly understood from the following description of some embodiments thereof, given by way of example only with reference to the accompanying drawings, in which:

FIG. 1 is a schematic representation of an image processing apparatus of the invention;

FIG. 2 is a more detailed diagram of a face changer unit of the apparatus;

FIGS. 3(a), 3(b) and 4 are diagrams showing parts of the face changer unit in more detail;

DETAILED DESCRIPTION

Figure 3A:
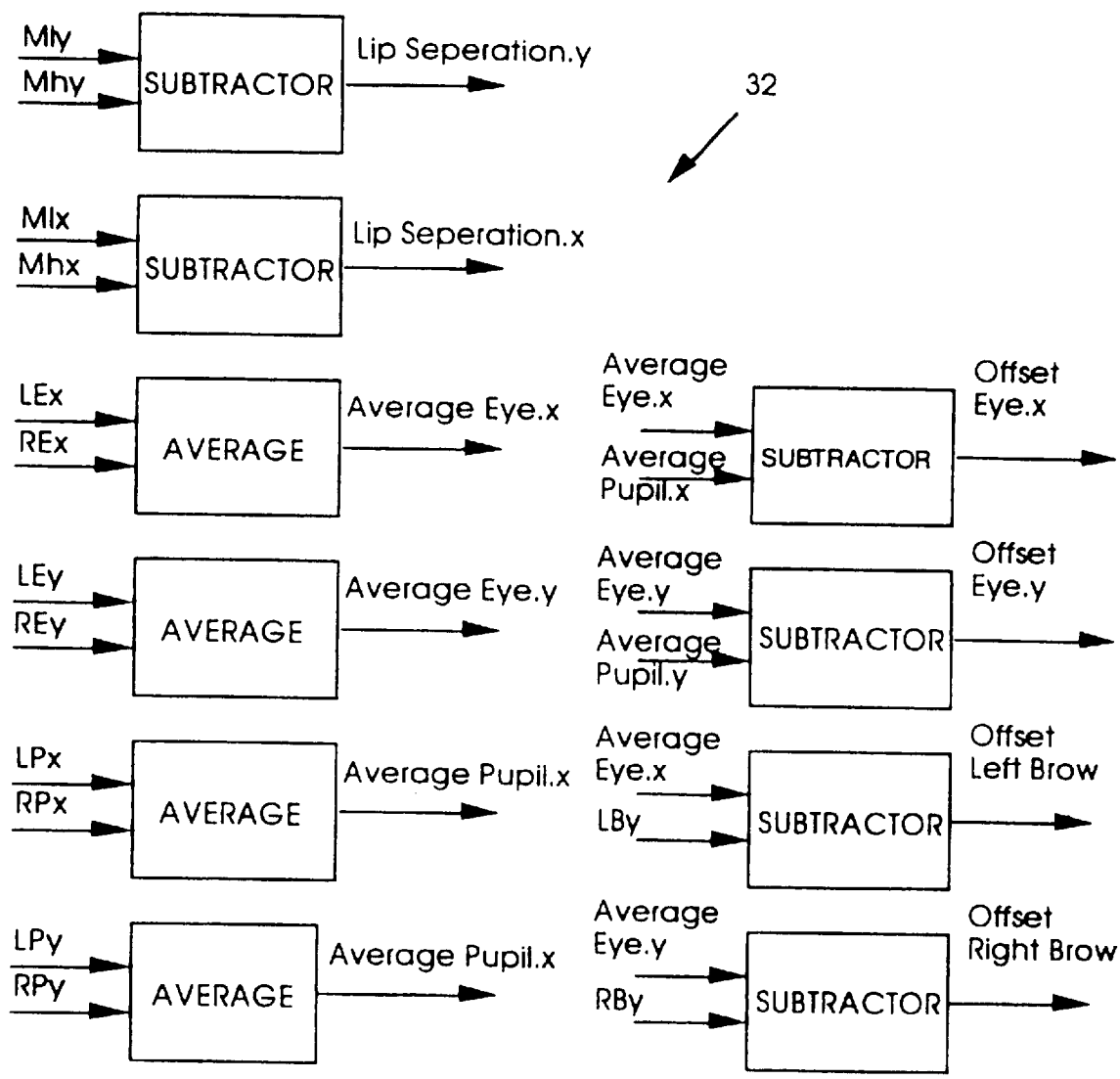

Referring to the drawings, and initially to FIG. 1, there is shown an image processing apparatus of the invention, indicated generally by the reference numeral 1. The apparatus 1 comprises a camera 10 and an output device, namely a video monitor 20. Between these two devices, there is a face changer unit 30 which is connected at its input to the camera 10 and at its output to a video multiplexer 60(a). The face changer unit 30 is also connected to provide an output signal to a video multiplexer 60(b), the output of which is connected to the video monitor 20. Accordingly, the output of the face changer may be directed via the video multiplexer 60(a) to a videophone interface 70 or directly to the monitor 20. The apparatus 1 also comprises a memory store 40 which is connected to the face changer unit 30. The memory store 40 may receive inputs via the videophone interface 70 and a control logic unit 50 or from the video multiplexer 60(b). The camera 10 is also connected to the video multiplexer 60(a) to by-pass the face changer unit 30.

Briefly, the function of the apparatus 1 is to capture a facial image in real-time and to provide an output either directly to the monitor 20 or to a remote system via the videophone interface 70 of an image representing a substitute face which has the same facial expressions as the subject. In this way, the subject or user can choose whether or not to output his or her own image, or that of a substitute. When a substitute is chosen, the image is that of a "real" face which the viewer would believe is that of the subject, if that is desired. Accordingly, the apparatus provides a large degree of versatility in the range of uses and applications, for example, it could be used for security-related applications where identity of the subject must be kept secret. The invention also allows output of an animated face where desired.

Construction and operation of the apparatus 1 will now be described in more detail. Referring to FIG. 2, the face changer unit 30 comprises a facial part detection unit 31 which generates a facial feature extraction tracking signal, a memory interface 32, and a video output circuit 33. As is clear from this diagram, interfacing with the memory store 40 is an integral part of operation of the face changer unit 30.

The facial part detection unit 31 takes an input video signal from the camera 10, captures images and detects the facial parts such as mouth, eyes, eye pupils, eyebrows etc. by color region monitoring and determines their positions within that image. The output of the facial part detection unit 31 is a feature extraction tracking signal having a set of positional parameters for the facial parts. These parameters are:

| | |
|---|---|
| Mlx, Mly, Mhx, Mhy | Specify the Mouth Box |
| Slx, Sly, Shx, Shy | Specify the Face Box |
| LEX, LEy | Specify the Left Eye Position |
| REX, REy | Specify the Right Eye Position |
| RPX,;RPy | Specify the Right Pupil Position |
| RBx, RBy | Specify the Right Eyebrow Position |
| LPx, LPy | Specify the Left Pupil Position |
| LBx, LBy | Specify the Left Eyebrow Position |

The manner in which these parameters are generated is described in more detail below.

The memory interface 32 uses the positional parameters to generate a set of facial characteristics so that the facial feature position and orientation can be expressed. These characteristics are:

Mouth Openness in X Orientation

Mouth Openness in Y Orientation

Face Rotation in X Orientation

Face Rotation in Y Orientation

Face Rotation in Z Orientation

Eye Direction in Horizontal Position

Eye Direction in Vertical Position

Eyebrow Vertical Position

Figure 3B:
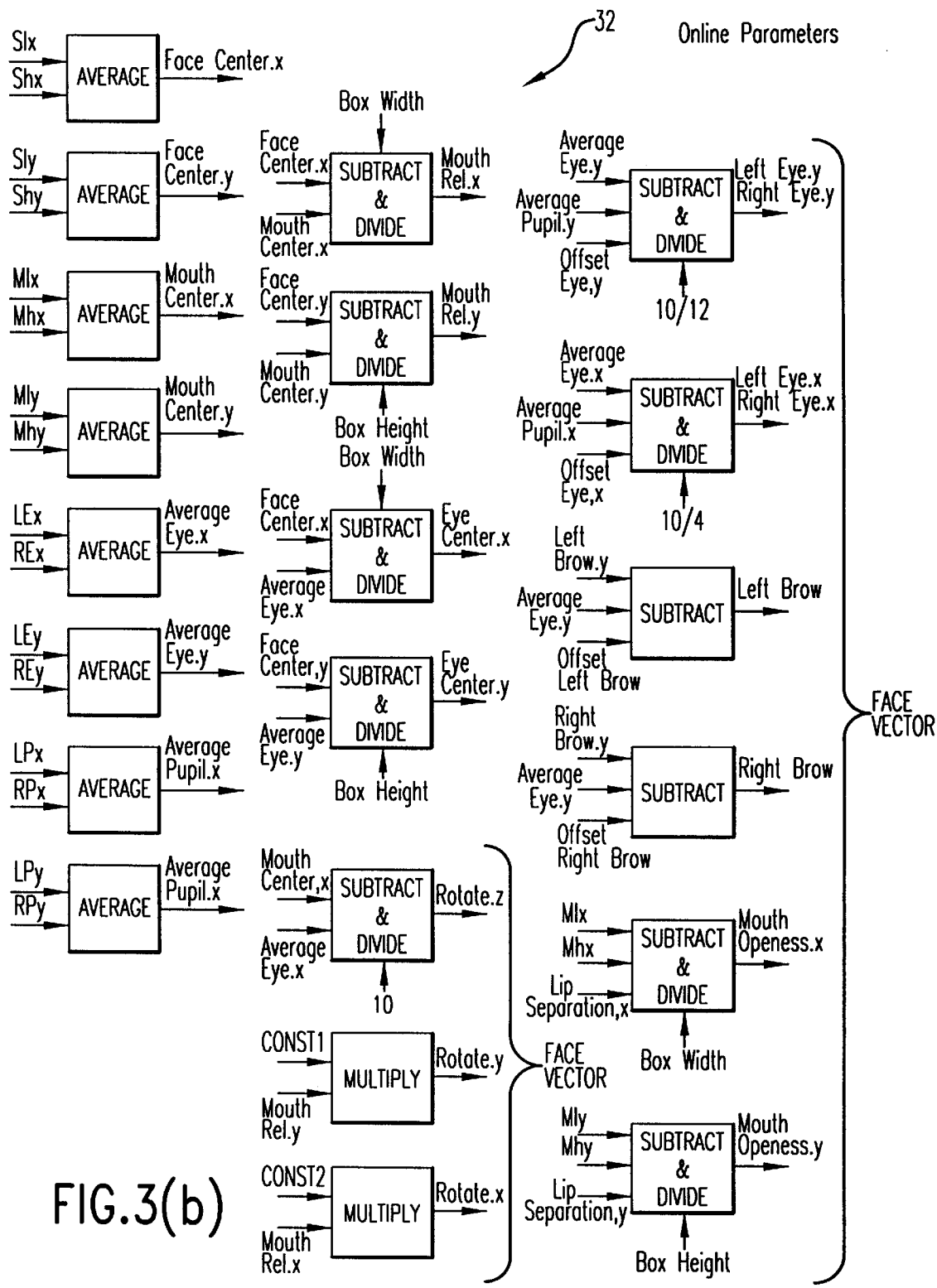

Construction of the memory interface 32 is shown in FIGS. 3(a) and 3(b) whereby various average, subtract, subtract and divide, and multiply circuits are used. The following functions are carried out by the various parts of the memory interface 32 to convert the received facial part position parameters to the facial characteristics.

| Initialisation Parameters | | |
|---|---|---|
| Lip Separation.y | = | Mly-Mhy |
| Lip Separation.x | = | Mlx-Mhx |
| Average Eye.x | = | (LEx + REx)/2 |
| Average Eye.y | = | (LEy + REy)/2 |
| Average Pupil.x | = | (LPx + RPx)/2 |
| Average Pupil.y | = | (LPy + RPy)/2 |
| Offset Eye.x | = | Average Eye.x-Average Pupil.x |
| Offset Eye.y | = | Average Eye.y-Average Pupil.y |
| Offset Left Brow | = | LBy − Average Eye.y |
| Offset Right Brow | = | RBy − Average Eye.y |
| Online Parameters | | |
| Average Eye.x | = | (LEx + REx)/2 |
| Average Eye.y | = | (LEy + REy)/2 |
| Average Pupil.x | = | (LPx + RPx)/2 |
| Average Pupil.y | = | (LPy + RPy)/2 |
| Face Center.x | = | (Slx + Shx)/2 |
| Face Center.y | = | (Sly + Shy)/2 |
| Mouth Center.x | = | (Mlx + Mhx)/2 |
| Mouth Center.y | = | (Mly + Mhy)/2 |

Mouth Rel.x = (Face Center.x − Mouth Center.x)/BOX WIDTH
Mouth Rel.y = (Mouth Center.y − Face Center.y)/BOX HEIGHT
Eye Center.x = (Face Center.x − Average Eye.x)/BOX WIDTH
Eye Center.y = (Face Center.y − Average Eye.y)/BOX HEIGHT
Rotate.z = (Average Eye.x − Mouth Center.x)/10
Rotate.y = CONST1 * Mouth Rel.y
Rotate.x = CONST2 * Mouth Rel.x
Left Eye.x = Right Eye.x = (Average Eye.x − Average Pupil.x − Offset Eye.x) * 10/4
Left Eye.y = Right Eye.y = (Average Pupil.y − Offset Eye.y)* 10/12
Left Brow = Left Brow.y − Average Eye.y − Offset Left Brow
Right Brow = Right Brow.y − Average Eye.y − Offset Right Brow
Mouth Openness.x = (Mlx − Mhx − Lip Separation.x)/BOX WIDTH
Mouth Openness.y = (Mly − Mhy − Lip Separation.y)/BOX HEIGHT The last nine variables (underlined) which are calculated by use of the online parameters constitute a face vector. The face vector is transmitted from the memory interface 32 to the memory store 40, where it is used to construct an output image of a substitute face, which is in turn received by the memory interface 32 and outputted by the video output circuit 33.

As shown in FIG. 4, the video output circuit 33 translates digital image data into analogue video signals for output to a video monitor. This is achieved by use of a converter 3301. In this embodiment, the output is RGB, however, it will be appreciated that any desired video output format may be provided.

Figure 5:
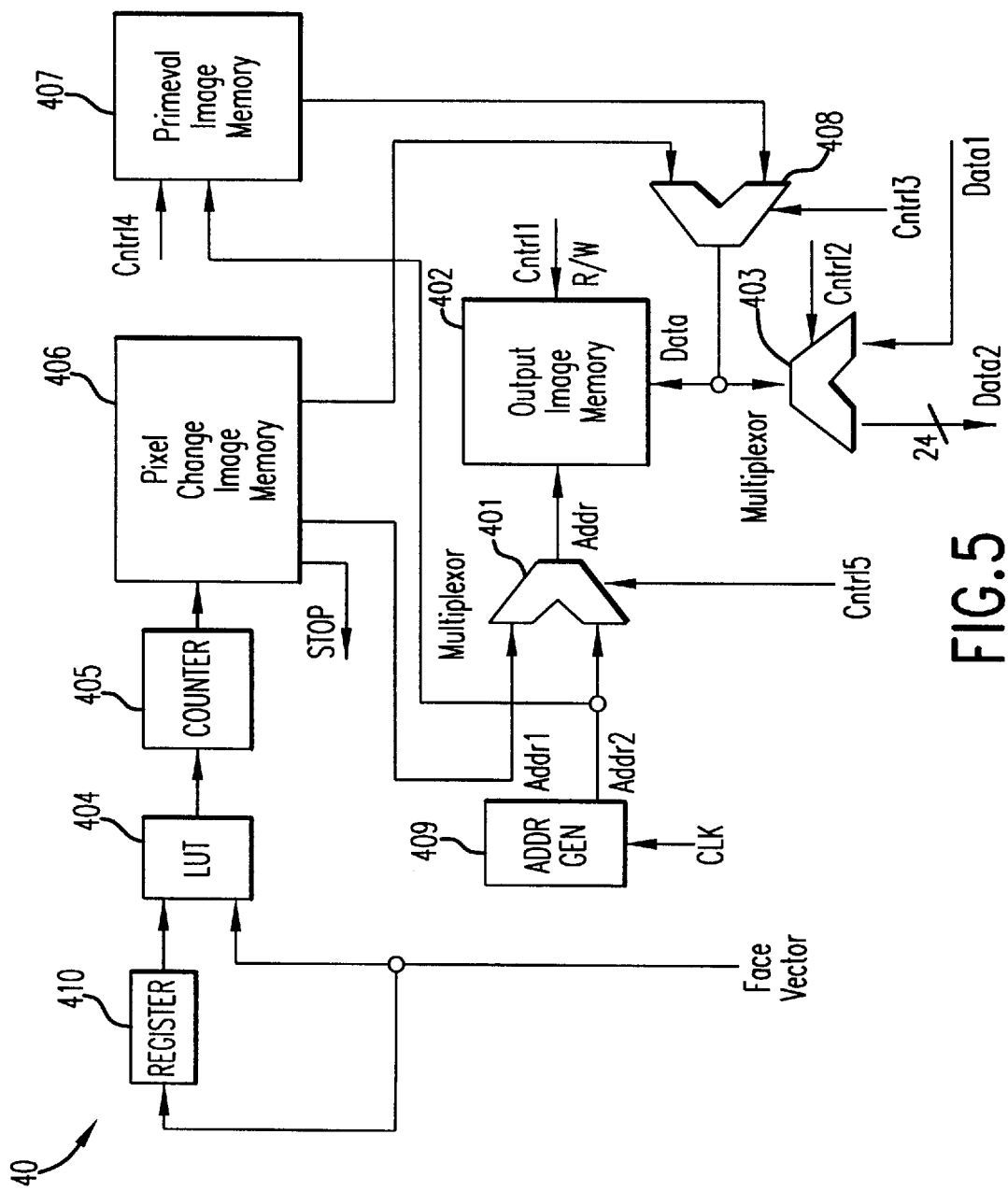
FIG. 5 is a schematic representation of a memory store of the apparatus.

The memory store 40 is an important part of the apparatus 1 as it receives the face vector signal from the memory interface 32 and provides an output image signal representing the substitute face having the facial characteristics of the subject. As shown in FIG. 5, the memory store 40 comprises an output image memory 402, a primeval image memory 407 and an update or pixel change image memory 406. Further, the memory store 40 comprises a lookup table 404 and a register 410, both of which are connected to the memory interface 32 to receive the face vector signal. The lookup table 404 is connected to a counter 405, which is in turn connected to the update image memory 406. The update image memory 406 is connected to a multiplexer 401 to provide an address signal for the output image memory 402. The update image memory 406 is also connected to a multiplexer 408 to provide a data signal to the output image memory 402. An address generator 409 is also connected to the multiplexer 401. The memory store 40 further comprises a multiplexer 403 for transmission and receipt of image data.

In operation, various different primeval images of different real and/or animated substitute faces are stored in the primeval image memory 407. The update image memory 406 stores data relating to pixel changes between two frames. It is assumed that images are riot randomly selected from the memory store 40, but rather, because of the nature of the operation, that any individual image will be followed by one of a small finite set of images.

Starting from one primeval image, it is therefore possible to construct all of the other images by simply specifying which pixels have changed from frame to frame. This approach has the major advantage that the memory requirements are much smaller than simply storing every possible image.

In operation, the address generator initialises the output image memory 402 with the primeval image by loading the primeval image into the output image memory 402. The multiplexers 401 and 408 by use of control signals Cntrl3, Cntrl4, and Cntrl5 load the primeval image from the primeval image memory 407 into the output image memory 402. Initially, the address generator 409 is loaded with the start location of the primeval image memory 407, and using a CLK generates every pixel address until all data is transferred from the primeval image memory into the output image memory 402. After initialization, all subsequent image data is provided by the update image memory 406. The data stored in the update image memory 406 comprises data elements, each having three fields. The first field is a single bit wide and is used to indicate if the current data is the last in the sequence of pixels to update the image. The second field is the pixel address which is 16 bits wide if an image of 256×256 is being used. The third field is 24 bits wide and represents the RGB color value of the pixel.

The face vector for the time $T^{-1}$ is stored in the register 410. The current face vector and the $T^{-1}$ face vector form an address for the lookup table 404 which contains a pointer to the position in the update image memory 406 where the particular pixel changes between the two face vectors is stored. The pointer to the start of the pixels to be updated is initially loaded into the counter 405, which is used as the address to the update image memory 406.

When the lookup table 404 points to a location in the update image memory 406, the data element at this location is retrieved and the second field is sent to the address bus of the output image memory 402 via the multiplexer 401 controlled by the control signal Cntrl5. Likewise, the data in the third field is sent to the databus of the output image memory 402 via the multiplexer 408 controlled by the control signal Cntrl3. The control signal Cntrl1 is used to set the output image memory 402 to write status. The counter 405 is then incremented and the process is repeated until a bit in the first field which is set to '1' is encountered. This bit provides a control signal to the control logic unit 50 of the apparatus 1 to indicate that all pixels in the output image memory 402 have been updated. At this point, the address generator 409 is initialized to the first pixel in the output image memory 402 and then incremented so that the image can be read from the image memory 402 to the memory interface 32. The control signal Cntrl1 is used to indicate a read cycle and the multiplexers 401 and 403 are set using control signals Cntrl2 and Cntrl5 to allow data to be outputted to the memory interface 32.

It will be appreciated that very little memory is required because of the manner in which the memory store 40 operates, and in particular the fact that only pixel changes are used. This feature also provides for fast processing and allows operation in real time.

Figure 6:
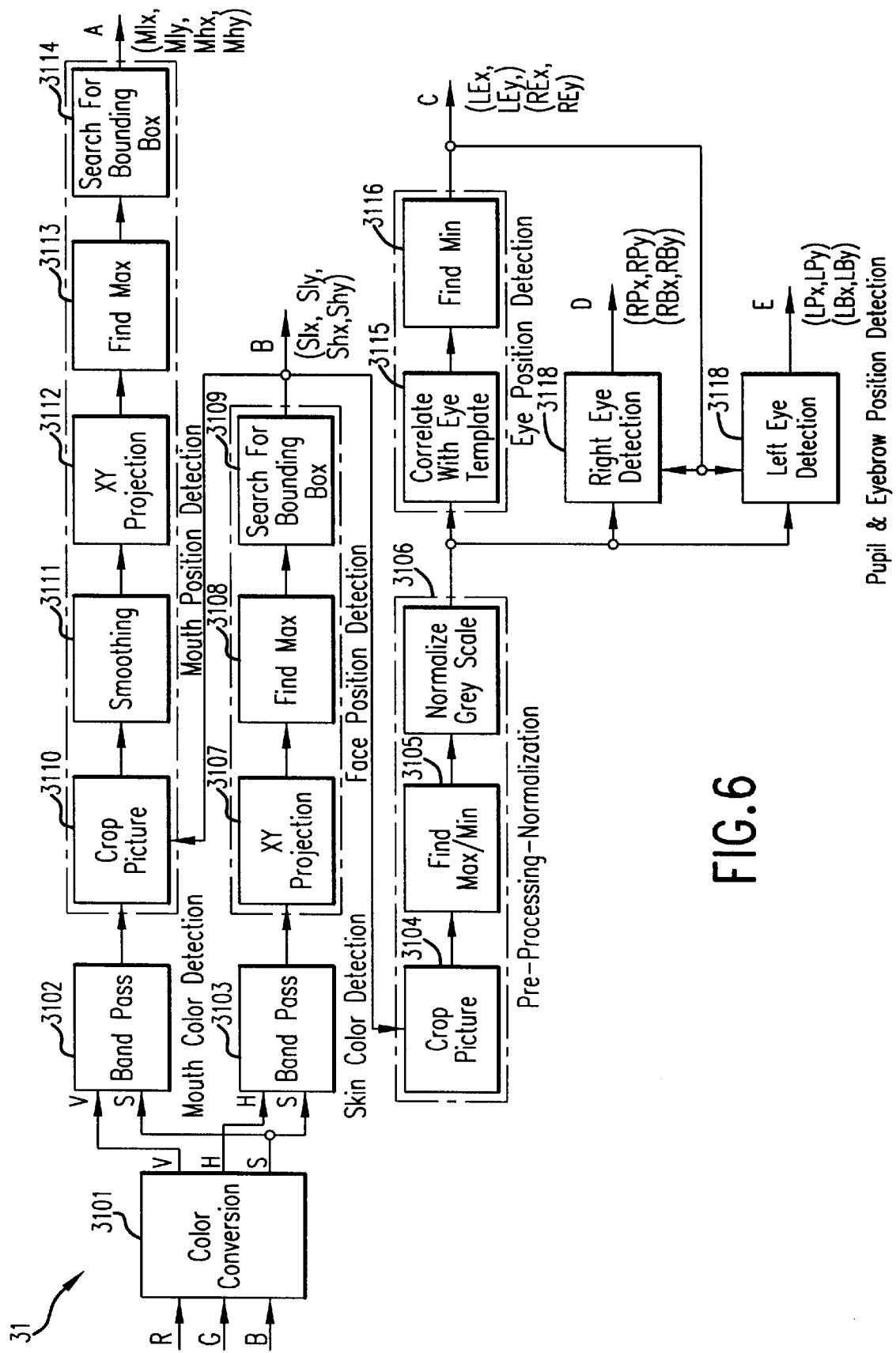
FIG. 6 is an overview diagram showing construction of a facial part detection unit of the apparatus.

Referring now to FIG. 6, the facial part detection unit 31 is now described in more detail. As described above, the function of the unit 31 is to provide a feature extraction tracking signal having facial part positional parameter values which are used by the memory interface 32 to generate the face vector. The facial part detection unit 31 provides five different feature extraction tracking signals, namely, A, B, C, D and E.

The A output represents the mouth coordinates and is provided by the following devices:

a band pass device 3102;

a crop picture device 3110;

a smoothing device 3111;

an XY projection device 3112;

a find max device 3113; and a bounding box search device 3114.

The output B specifies the face box and is provided by the following devices:

a band pass device 3103;

an XY projection device 3107;

a find max device 3108; and a bounding box search device 3109.

Crop picture, find max/min and normalise grey scale devices 3104, 3105 and 3106 respectively provide pre-processing normalization for the remaining outputs, C,D, and E. The output C represents the left and right eye positions and is provided by a device 3115 which correlates with an eye template, and a find min device 3116.

The output D specifies the right pupil and eyebrow positions and is provided by a right eye detection device 3117. Finally, the output E represents the left pupil and eyebrow positions and is generated by a left eye detection device 3118.

The converter 3101 takes as input a video signal (RGB, Composite, etc.) and outputs digital values of the color represented in the HSV color domain. The output is passed to the band pass devices 3102 and 3103 and the pre-processing normalization devices 3104 to 3106. The band pass device 3102 detects mouth color and the band pass device 3103 detects skin color. The skin color detection signal passes to the face position detection devices 3107, 3108 and 3109 which produce a box which gives the position of the face in the image. The facial box coordinates are passed to mouth position detection devices 3110–3114 which search the facial box region to determine the position of the mouth in the image. It is of course implied that the mouth position is to be found within the facial box.

The pre-processing-normalization devices 3104 to 3106 normalize the pixels in the facial box before outputting this image to eye position devices 3115 and 3116 and the pupil and eyebrow position detection devices 3117 and 3118. The purpose of this is to increase the accuracy of the correlation results in the eye position detection. The eye position detection devices 3115 and 3116 correlate the facial area of the normalized image with pre-stored eye templates to determine the location of the eyes, and produce two X,Y coordinates which specify the eye locations within the image. These eye position coordinates are passed to the pupil and eyebrow position detection devices 3117 and 3118 which use these coordinates to obtain areas around each eye which are then post-processed to obtain the pupil and eyebrow positions for each eye. An important aspect of operation of the unit 31 is operation of the band pass devices to filter the HV data and only pass through data which is shown to be present in a color template of the skin and face.

Referring now to the various diagrams of FIG. 7, the devices 3101 to 3118 are described in more detail.

Figure 7A:
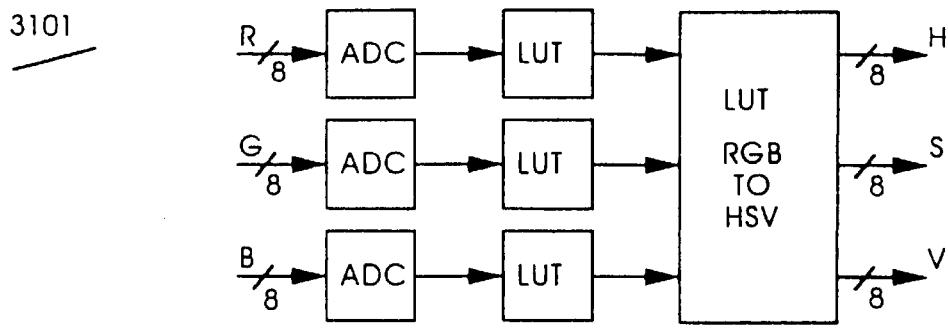
FIGS. 7(a) to 7(p) are various diagrams showing parts of the face changer unit of the apparatus in more detail.
Figure 7B:
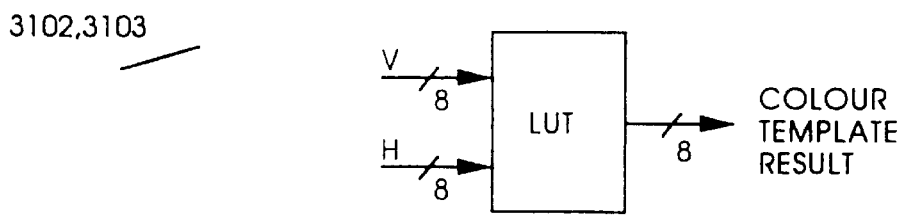
Figure 7C:
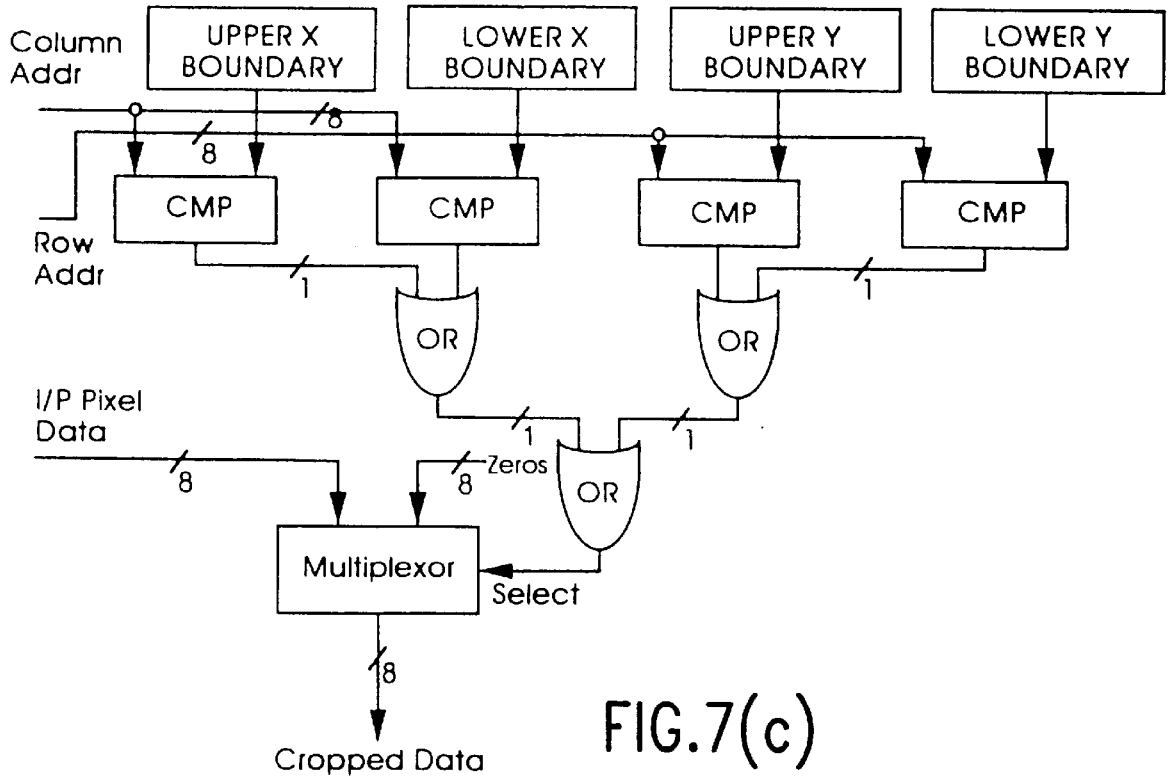

As shown in FIG. 7(a), the color conversion device 3101 comprises an ADC, and a look-up table for each of the R, G and B components, all connected to an RGB to HSV look-up table. There are several different implementations of this conversion which will be known to those people skilled in the art.

The input stage has an arrangement in which the S and V components are directed to the mouth detection filter 3102 and the H and S components are directed to the face detection filter 3103. Thus, each of these series of circuits must only process two components and may therefore be quite simple. It has been found that a combination of H (hue) which is essentially wavelength data together with S (saturation) is particularly effective for detecting skin. It has also been found that the S and V (value) components are particularly effective for distinguishing the mouth area within the already identified facial (skin) area.

The purpose of the band pass device 3102 is to filter the S,V data and only pass through data which has been shown to be present in a color template of the mouth. The device 3102 is shown in circuit form in FIG. 7(b) and is implemented as a look-up table (LUT). This may be an SRAM which is programmed off-line, or alternatively a PROM which is programmed in production. It has the same construction as the filter 3103 for facial area detection.

The feature of receiving two of the H, S, and V components for each of the mouth and face series of processing circuits is important. This avoids the need for the very large memories which are commonly required for the prior R, G, B systems and, further, avoids the need for backprojection. Instead, band pass filters 3102 and 3103 are used. The two components (S,V for mouth area, HS for face) form an address for the look-up table, which stores a value for each address. The table values are generated off-line according to reference mouth and face patterns. At its simplest, the values may be at the bit-level giving YES or NO indications for the particular S,V or H,S combinations. The XY projection devices 3112 and 3107 perform the next fundamental processing steps by mapping the retrieved table values over the pixel area and generating XY projections. Once this has been done, the next steps of finding maximum limits and searching for the bounding box can be easily implemented.

To put it simply, the band pass filtering and the XY projection over the pixel area are the fundamental steps and can be implemented by simple circuits. Further, the downstream steps are very simple to implement.

The purpose of the crop picture device 3110 is to limit the image processing tasks to only the area determined by the face position detection section as it receives the facial area information from the device 3109. There are two reasons for doing this. Firstly, as only a fraction of the image is processed, this increases the number of frames which can be processed in a given time period.

Secondly, it allows local operations such as normalization to be done on the facial area alone, unaffected by external influences such as bright light sources in other parts of the picture and random background noise. This increases accuracy in such tasks as eye-tracking.

Figure 7D:
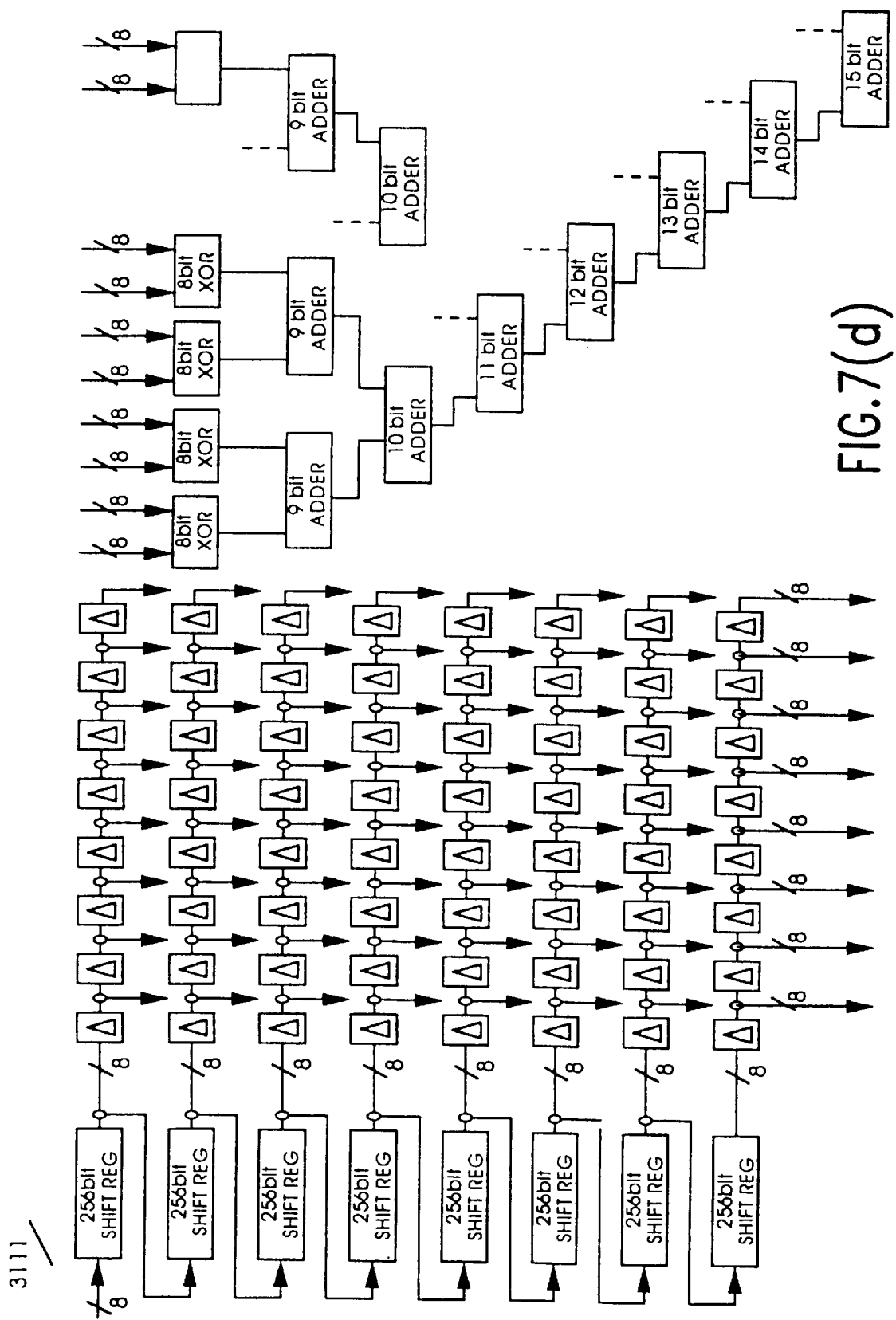
Figure 7E:
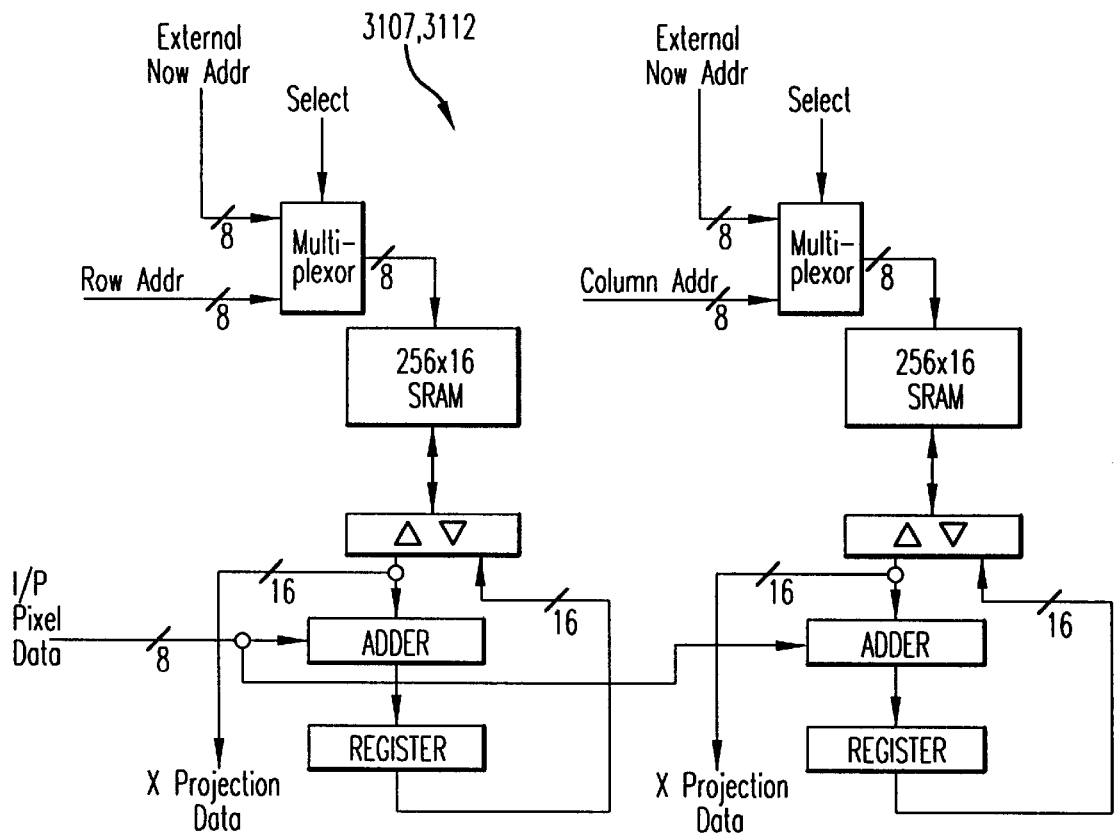
Figure 7F:
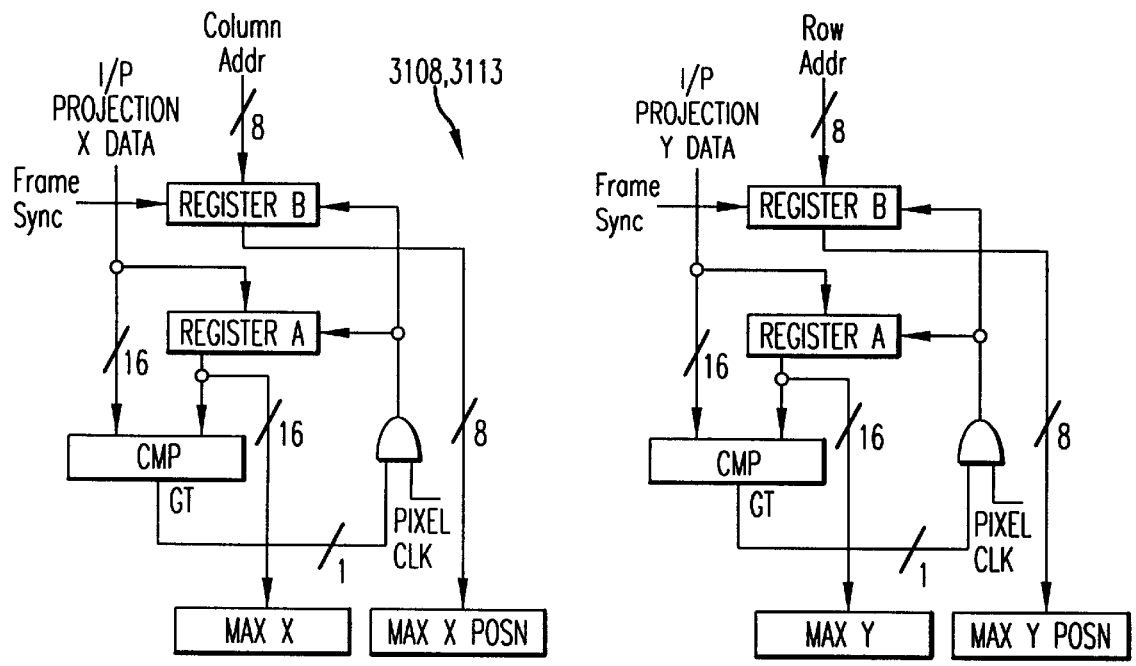
Figure 7G:
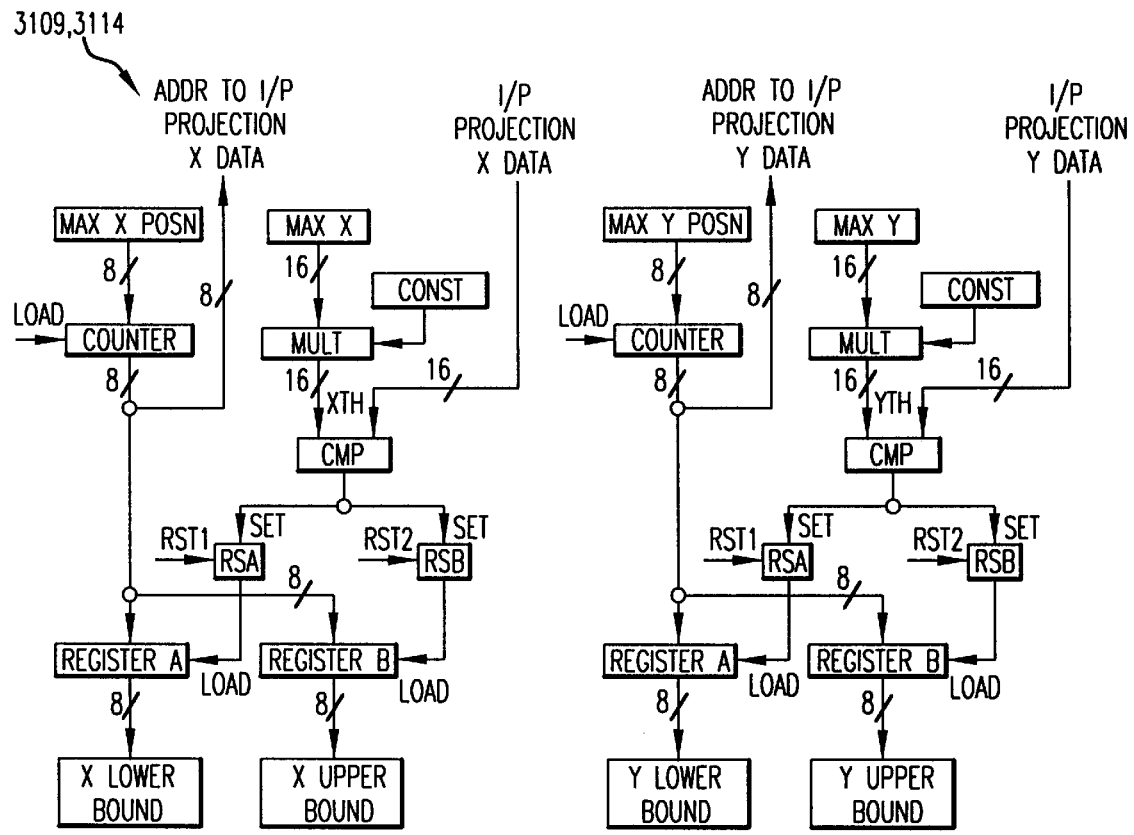
Figure 7H:
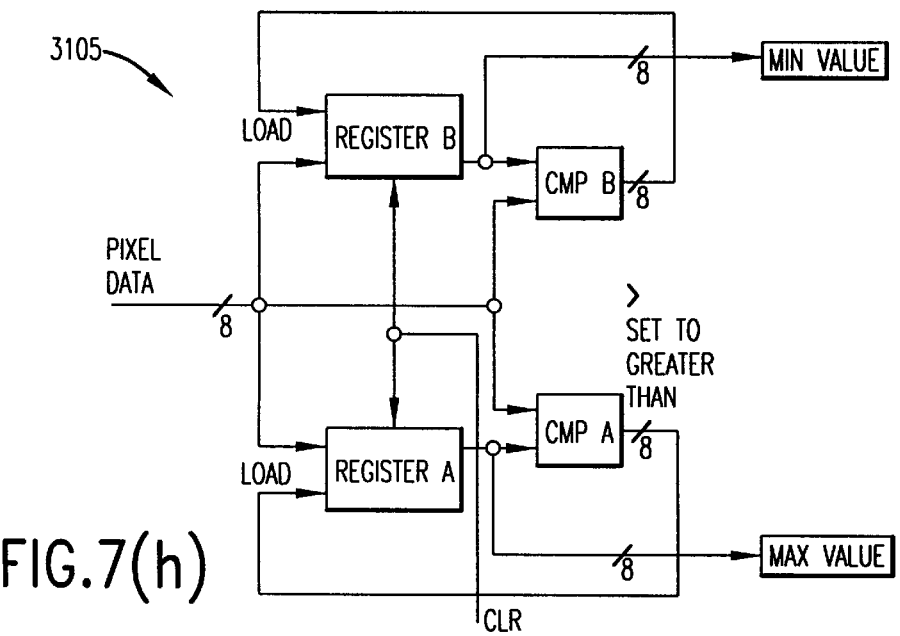
Figure 7O:
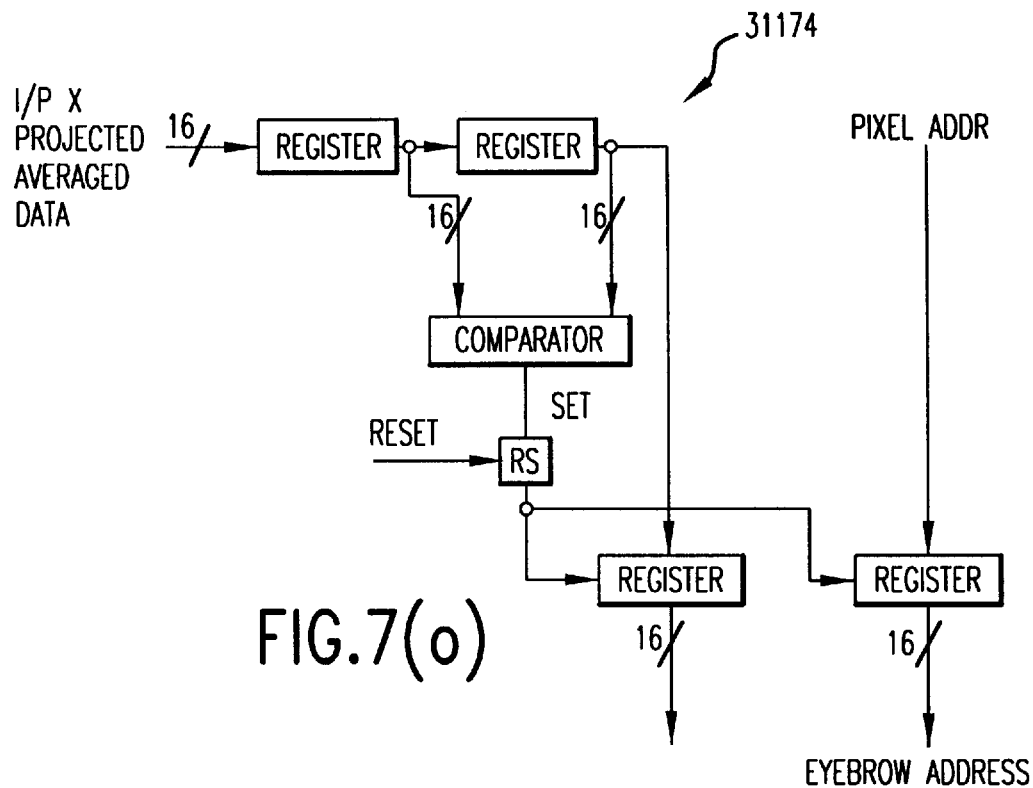
Figure 7P:
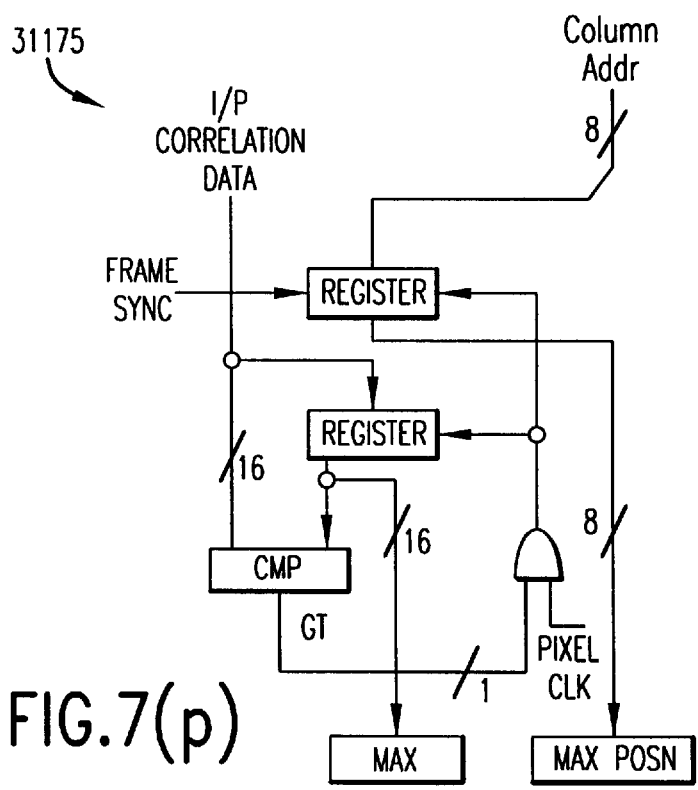

The purpose of the smoothing device 3111 shown in FIG. 7(d) is to aid mouth position detection in proceeding image processing by the devices 3112–3114. It will be noted that the face position detection stage (3107–3109) and the mouth position detection stage (3110–3114) share several common tasks, namely XY Projection, find max and search for bounding box. However, the mouth position detection stage includes two extra tasks which are not shown in the face position detection, namely crop picture and smoothing. The purpose of the crop picture device 3110 is explained above. The reason that smoothing is not present in the face position detection derives from the face that the task being undertaken is facial parts identification and position location. This implies that the face will occupy a large area in the input image. In any image processing task there is a level of background noise due to a variety of factors, for example, inaccuracies in the conversion of analogue data to digital data, stroboscopic effects from foreign lighting sources, light reflection from glasses, etc. These add noise to the processed image. In the detection of the facial area, since the skin will cover a large percentage of the input image, there is a considerable number of pixels which will be identified as belonging to the skin. Therefore, the background noise will have little or no effect on the results obtained from the face position detection. However, the mouth occupies a much smaller area, and therefore the background noise will have a much greater effect on obtaining correct results from the mouth position detection stage. The probability that a mouth pixel is mistaken for a skin pixel and vice-versa is high and affects mouth area detection. However, in the case of face position detection the fact that a mouth pixel is mistaken as a skin pixel actually helps in the location of the facial area, since the mouth area lies within the face area. However, the opposite applies for the mouth position detection. To help overcome this problem the image is smoothed before performing further image processing steps. It is assumed that the background noise is random in nature and will occur randomly over the image, whereas the mouth pixel recognition is highly concentrated in a single area. By averaging over an area, the effects of the background noise can be reduced while enhancing the areas where recognition is highly concentrated. The principle behind the device 3111 is to average all pixels within an 8×8 area, and place the result at the central pixel point. The operation of this circuit and its underlying principles will be understood to those skilled in the art. The resulting image is a smoothed representation of the input image.

Further image processing tasks are performed on the smoothed image by the devices 3112–3114, namely XY Projection, find max and search for bounding box. These devices function in the same manner as the devices 3107 to 3109 in the face detection stage which are described in detail below. The output from the device 3114 is a signal indicating a box which defines an area in the input image where the mouth is located.

The purpose of the device 3107 shown in FIG. 7(*e*) is to perform an XY projection on the image which is outputted from the device 3103 to effectively map the filter output over the pixel area. The device 3107 can be divided into two sections which operate in the same fashion, the left hand side which evaluates the X projected data, and the right hand side which evaluates the Y projected data. The circuit comprises a 256×16 bit SRAM which is used to store the X projected data, a multiplexer to arbitrate access to the databus of the SRAM, a multiplexer to arbitrate access to the address bus of the SRAM, an adder to perform additions on the projected data, and a register to act as an intermediate data store. The circuit functions in the following manner: It is assumed that the SRAM can have all bits set to zero, i.e. the SRAM can be cleared, at the beginning of every XY projection, however, this function is not shown in the diagram. It is also assumed that the maximum image size is 256×256 pixels, however, to those skilled in the art, it is possible to adapt the circuits to handle large images. Pixel data is inputted into the circuit through I/P pixel data, with the address of each pixel being inputted through Row Addr and Column Addr. It is assumed that the Select line is set so that Row Addr signals impinge upon the SRAM, and that the bi-directional buffer is configured to allow data to be read from the SRAM into the ADDER. The Row Addr reads the present X projection value from the SRAM into the ADDER circuit. The ADDER adds together the data from the SRAM and that of the I/P PIXEL DATA and puts the result into the REGISTER. The bi-directional buffer is then configured to write data from the REGISTER into the SRAM so that the new result is stored. The next pixel value is then inputted into the circuit with the new Row Addr signal being used to select the appropriate X storage location. The process is repeated until all pixels in the image have been processed. By changing the select switch to allow the External Row Addr to impinge upon the SRAM it is possible to read out the final X projection values. The operation of the Y projection is carried out in parallel to the X projection.

The purpose of the device 3108 shown in FIG. 7(*f*) is to find the maximum value in the X and Y projection data so that an X and Y location which lies within the facial area can be found. The device 3108 can be divided into two sections, which both process in parallel and operate in the same fashion. The basic principle of the circuit is that each final projection value is compared using a comparator CMP with a maximum value stored in REGISTER A. If the projection data value is greater than the value in REGISTER A then this new value is stored in REGISTER A, while simultaneously the column address is stored in REGISTER B. Data from the XY projection device 3107 is read out serially, and impinges upon REGISTER A and CMP, while the addresses is of the Projection value impinge upon REGISTER B. The output of REGISTER A is also outputted to CMP where the contents of REGISTER A and the Projection X value are compared. If the result indicates that the projected value is greater than the contents of REGISTER A then a signal is generated in conjunction with the PIXEL CLK which loads the new data value into REGISTER A, while simultaneously loading the address of the pixel into REGISTER B. This process is repeated for X(Y) projected values. The values remaining in REGISTER A and B indicate the maximum projected value and the location at which it occurred.

The purpose of the device 3109 shown in FIG. 7(*g*) is to determine the limits for a bounding box which will enclose the skin area. This area will be used in subsequent image processing tasks. The circuit can be divided into two identical sections, the left hand side relating to finding the boundaries, the right hand side to the Y boundaries. This circuit uses information from the device 3108, namely MAX X POSN, MAX X, MAX Y POSN and MAX Y. The operation of the circuit is to derive a threshold value, $X^{TH}$, for the X data using MAX X, and a threshold value, $Y^{TH}$, for the Y data using MAX Y. This is achieved by multiplying the MAX X(Y) by a constant which is less than one. The constant multipliers may be different for the X and Y data. The next stage is to determine the lower boundary. By starting at the MAX X POSN and repeatedly decrementing its position while checking if the X Projection data at this new location is less than the threshold value, $X^{TH}$, the point at which the X projected data goes beneath the threshold can be found. This is the X LOWER BOUND. By starting at the MAX X POSN and repeatedly incrementing its position while checking if the X Projection data at this new location is less than the threshold value, $X^{TH}$, the point at which the X projected data goes beneath the threshold can be found. This is the X UPPER BOUND. The calculation of the Y boundaries follows a similar pattern. The circuit operation is as follows. The MAX X data from the device 3108 is multiplied by CONST in MULT and the result, which is $X^{TH}$ is passed to CMP, where all data from I/P PROJECTION X DATA will be compared to $X^{TH}$. The value MAX X POSN, also from the device 3108, is loaded in the counter using the LOAD signal, originating from device 50. The device 50 also provides control signals RST1 and RST2 which reset the RSA and RSB flip flops into the RESET state. This will provide the address to look up the final X Projection values in device 3107. The multiplexer in the device 3107 is set so that the address from the address from the External Row Addr impinges upon the SRAM. In this way, the X Projection data values can be read from the SRAM and into the divide 3109. Data from the device 3107 arrives at I/P PROJECTION X DATA where it is compared against the $X^{TH}$ value. If the result of the comparator, CMP, shows that the I/P PROJECTION X DATA is less than $X^{TH}$, then a signal is generated which causes the RS flip flops RSA and RSB to be put in the SET position. The address in the COUNTER is decremented until the comparator, CMP, shows that the threshold has been exceeded, at which point both flip flop RSA and RSB are placed in the SET state. The signal from the flip flops is used to load REGISTER A with the current COUNTER value which indicates the X LOWER BOUND. The COUNTER is then loaded with the MAX X POSN once again using the LOAD signal. This time, instead of decrementing the COUNTER, the COUNTER is incremented until the data once again exceeds the threshold value, $X^{TH}$. This time the RSB flip flop is placed in the SET state and the output of RSB flip flop is used to load REGISTER B with the value of COUNTER, which this time indicates the X UPPER BOUND. The operation for the Y projected values is the same. At the end of this process, the flip flops RSA and RSB are reset using the control signals RST1 and RST2 from device 50, and the process is repeated for the next frame.

At this stage the bounding box for the facial area has been discovered and a preliminary check can be carried out. If the area of the box is found to be extremely small, of the order of less than 20 pixels, then it can be assumed that there is no face within the image and the ongoing image processing tasks of finding the mouth and eyes can be abandoned.

The pre-processing normalization section uses the devices 3104–3106. The purpose of the pre-processing normalization section is to normalize the image before performing correlation to increase the accuracy of the results. This section does not perform image processing on color information, but on a grey scale image. The V video signal of the HSV video standard is a grey scale representation of the input image.

The purpose of the crop device 3104 shown in FIG. 7(*c*) is to limit the image processing tasks to only the area determined by the face position detection section and not the whole image. The reasons for doing this are explained above.

The find max/min device 3105 is shown in circuit form in FIG. 7(*h*). The purpose of this device is to find the maximum and minimum pixel values within the image. This information is to be used in the proceeding image processing stage. The device 3105 is comprised of two registers, REGISTER A and REGISTER B, and two comparators, CMP A and CMP B, REGISTER A and CMP A are used to find the MAX VALUE, whereas REGISTER B and CMP B are used to find the MIN VALUE. The pixel data from the input image is inputted serially via the PIXEL DATA input. The data impinges upon both registers and both comparators. REGISTER A is used as a temporary storage area for the maximum value, MAX VALUE, whereas REGISTER B is used as a temporary storage for the minimum value, MIN VALUE. At the beginning of each frame REGISTER A must be set to 0 and REGISTER B must be set to 255 by the unit 50 via the control signal CLR. The output of REGISTER A is input to the CMP A where it is compared to the input data. If the result from the comparator CMP A shows that the input data is greater than the data stored in REGISTER A then the comparator generates a LOAD signal which loads the input pixel data into REGISTER A. The operation for minimum value uses the same principle with the comparator generating a load signal when the result from the comparator CMP B shows that the input data is less than the data stored in REGISTER B. After all pixels in the input image have been processed through the circuit the maximum value resides in MAX VALUE, and the minimum value resides in MIN VALUE. Before the next input image can be processed both registers must be initialized to their respective values.

The normalize grey scale device 3106 is shown in circuit form in FIG. 7(*i*). The purpose of this stage is to translate the input image in such a way that it uses the full range of possible values, namely 0 to 255. The device 3105 processed the image and found the maximum values. In an 8 bit grey scale representation the minimum value possible is 0, and the maximum value possible is 255. However, results from the device 3105 will indicate that from frame to frame the maximum and minimum values found will not be the maximum and minimum possible. Therefore, it is advantageous that a method be devised that changes the input image so that it fits the full range of values. The simplest method, as shown in FIG. 7(*i*) is that of a look-up table, 31068, which for an 8 bit input and 8 bit output requires a 256×8 bit memory. This look-up table must be programmed frame by frame, as the maximum and minimum values will change frame by frame. The algorithm for programming the look-up table is as follows:

$$255 \leq x < \text{Max} \quad \text{Coeff}(x) = 255$$
$$\text{Max} \leq x \leq \text{Min} \quad \text{Coeff}(x) = (int)(255 * (x - \text{Min})/(\text{Max} - \text{Min}))$$
$$\text{Min} < x \leq 0 \quad \text{Coeff}(x) = 0$$

where the values Max and Min refer to the values of MAX VALUE and MIN VALUE calculated by the device 3105. Max and Min must be between the values of 0 and 255, and Max >Min. FIG. 7(*i*) shows that the circuit of the device 3106 is made up of devices 31061–31069. The circuit has two modes of operation. The first where the coefficients of the look-up table are calculated and the other where these coefficients are to convert the input image into the normalized output image. The parts 31061–31067 are involved with the calculation of the coefficients which are stored in the SRAM 31068. The data is transformed by allowing the PIXEL DATA to impinge upon the SRAM as the address by setting the SELECT control signal to the correct state. This control signal is under the control of the control unit 50. At the start of each frame all locations in the LUT are set to zero and the MIN VALUE is loaded into a counter, indicated as the part 31061. The MIN VALUE along with MAY, VALUE are obtained from the device 3105. The counter is loaded using a LOAD control signal from the control logic unit 50. The output of the counter is inputted to a comparator CMP, which compares the counter value with the MAX VALUE. If the value of the counter is greater than MAX VALUE then this indicates that all coefficients have been loaded into look-up table and that the normalization process can start. The comparator CMP outputs a control signal named FIN- ISHED which is sent to the control unit 50. The coefficient calculation can be divided into three steps. In the first step two calculations occur in parallel, namely,

| | | |
|---|---|---|
| (a) | MIN VALUE − x | where x is the present counter value |
| (b) | MAX VALUE − MIN VALUE | |
| then, | | |
| (c) | CONST × (Result of 1) | using part 31066 |
| then, | | |
| (d) | (Result of 3)/(Result of 2) | using part 31067 |

The value of CONST is set to 255. The SELECT switch of the multiplexer MUX is set to allow the output of the counter to impinge upon the address bus of the SRAM. By setting the R/W line of the SRAM to write, the results from the division part 31067 are written into the SRAM at the location specified by the counter 31061. The counter is then incremented and the process repeated until the comparator CMP indicates that all coefficients have been calculated and stored in the SRAM. At this point the look-up table to normalize the input image. The SELECT signal is switched to allow the PIXEL DATA to impinge upon the address bus of the SRAM and the R/W control signal is switched to read. The input image is then presented to the SRAM where it is transformed by the look-up table and outputted to the NORMALIZED PIXEL DATA stage. When all pixels have been transformed the counter is again loaded with MIN VALUE, all LUT values are set to zero, and the process is repeated.

The output of the pre-processing-normalization section is passed to two further sections, namely the eye position detection stage which finds the eye positions, and the pupil and eyebrow position detection stage which finds the eye pupil and eyebrow positions.

The eye position detection stage has two devices, the correlate with eye template device 3115 and the find max device 3116. The eye position detection is processed twice, once with templates for the left eye, and once with the templates for the right eye.

The correlate with eye template device 3115 is shown in circuit form in FIG. 7(j). The purpose of the device 3115 is to correlate the input image against several pre-stored templates of right and left eye images. The result closest to zero from the right eye correlation indicates the position of the right eye, and the result closest to zero from the left eye correlation indicates the position of the left eye. The correlator circuit comprises a circuit which implements the following mathematical function in integer arithmetic, using only 4 bits of accuracy.

$$\overline{P}(x,y) = \sum_{i=-8}^{i=7} \sum_{j=-8}^{j=7} (P(x+i,y+j) - T(i,j))^2$$

where P is the input image, T is the template image, x and y are positional indicators within the input image. This equation is computed for each pixel in the output image.

The algorithm computes the square of all differences between pixels in the input image and the template image. In the case that the input image and the template image are identical so that the result is zero, the accuracy can be improved by adding more bits, however, this leads to a more complex hardware implementation.

Equation (1) can be simplified so show the basic image processing steps which are needed to implement this equation.

$$\overline{P}(x,y) = \sum_{i=-8}^{i=7} \sum_{j=-8}^{j=7} (P(x+i,y+j)^2 + T(i,j))^2 - (P(x+i,y+j)T(i,j))$$

wherein $T(i,j)^2$ is a constant, $P(i,j)^2$ is the sum of all pixels squared in the input image, and $P(i,j)T(i,j)$ is the multiplication and summation of all pixels in the input image with the corresponding pixel in the template image.

It can be clearly seen that the algorithm can be divided into several steps, some of which can be executed in parallel.

(1) Compute $P(i,j)^2 m$,
(2) Compute $P(i,j)T(i,j)$,
(3) Add $T(i,j)^2$ to (2), $T(i,j)2$ is a constant can so can be calculated off-line
(4) Subtract (2) from (3)

This reduces the calculation to four basic steps.

The device 3115 has parts 31151–31156. The parts 31511 and 31153 are 16×16 8 bit correlators, part 31151 performing the $P(i,j)T(i,j)$ and part 31153 performing 31153 performing the $P(i,j)^2$. The part 31152 is an 256×8 SRAM which is used as a lookup table to convert the input image pixel values to their squared values before correlation. This is required so that numerical accuracy is maintained throughout the correlation process.

The results from the correlation are inputted to the find min device 3116 where the minimum value and the position of the minimum value are found. A circuit of the device 3116 is shown in FIG. 7(k). It can be seen from the diagram that the device 3116 is similar to the device 3108 and operation of both circuits is identical.

It is envisaged that the eye position detection stage can be expanded so that multiple eye templates can be correlated and the best correlation value found. The implementation of this type of system will be clear to those skilled in the art.

The final output from the eye position detection system are two pixel locations, (LEx,LEy) and (REx,REy), which define the location of left and right eye in the input image.

The devices 3117 and 3118 (shown in FIG. 7(l)), for right eye detection and left eye detection, make up the pupil and eyebrow position detection stage. The purpose of the pupil and eyebrow position detection stage is to use the eye coordinates, (LEx,LEy) and (REx,REy), obtained from the device 3116, together with the normalized image from the device 3106, to find the positions of the eye pupil and eyebrow for both the left and right eyes.

The device 3117 for right eye detection is shown in circuit form in FIG. 7(l). The device 3117 is comprised of parts 31171–31175. The first part 31171, known as crop picture, is used to obtain a region of interest, using the right eye coordinates (REx,REy) as the central pixel. This sub-image is then outputted to the part 31172, known as X Projection which performs an X projection on the sub-image. The circuit to implement the part 31172 is shown in FIG. 7(n). The functioning of the part 31172 is identical to that of the device 3107.

The data from the device 31172 is passed to the device 31173 for smoothing where the X projection data is smoothed from the uppermost row of sub-image to the lowest. A circuit which implements the device 31173 is shown in FIG. 7(m). The principle behind this circuit is that the serial input stream is averaged over four pixel values and the output is the averaged pixel stream. In order to average, the pixels are stored in REGISTERs with the outputs being fed to adders. The result from the adders is then outputted to a SHIFTER, which shifts the result right by two places, corresponding to a divide by 4. The next pixel is then inputted to the circuit and stored in the first REGISTER. In parallel the previous stored data is shifted along the REGISTER chain. The new average is then computed and outputted. This process is repeated until all X projected data have been smoothed.

The averaged X projected data from the part 31173 is then passed to the device 31174. The purpose of this device is to search the averaged X projected data from the uppermost row value to the lowermost row value and find the maximum peak in the data. This peak corresponds to the y coordinate location of the eyebrow. A circuit which implements the part 31174 is shown in FIG. 7(*o*). The principle of this circuit is to locate the position where the $(N+1)^{th}$ data value is less than the $N^{th}$ data value, since this shows that a peak has been encountered. The $(N+1)^{th}$ and $N^{th}$ data values are provided by the REGISTERs, whose outputs are fed to a COMPARATOR which compares the values and outputs a SET signal to an RS flip flop when the $(N+1)^{th}$ data value is less than the $N^{th}$ data value. The RS flip flop is used to issue a load signal to two REGISTERS which store the pixel value and the location at which it occurred. This data represents to y location of the eyebrow, RBy. The RBx location is assumed to be the same as REx. Hence the location of the brow is now located at (RBx,RBy).

The purpose of the find minimum part 31175 is to find the position of the pupil. This is done by finding the minimum value in the normalized image. The circuit which is used to implement the part 31175 is shown in FIG. 7(*p*). Since the operation of this circuit is identical to that of the devices 3108 and 3113 it is not explained. The output of this circuit is the coordinate of the right eye pupil, (RPx,RPy).

The part 3118 is similar to device 3117, but differs in that it uses the coordinates of the left eye, (LEx,LEy), to crop the image.

Figure 8:
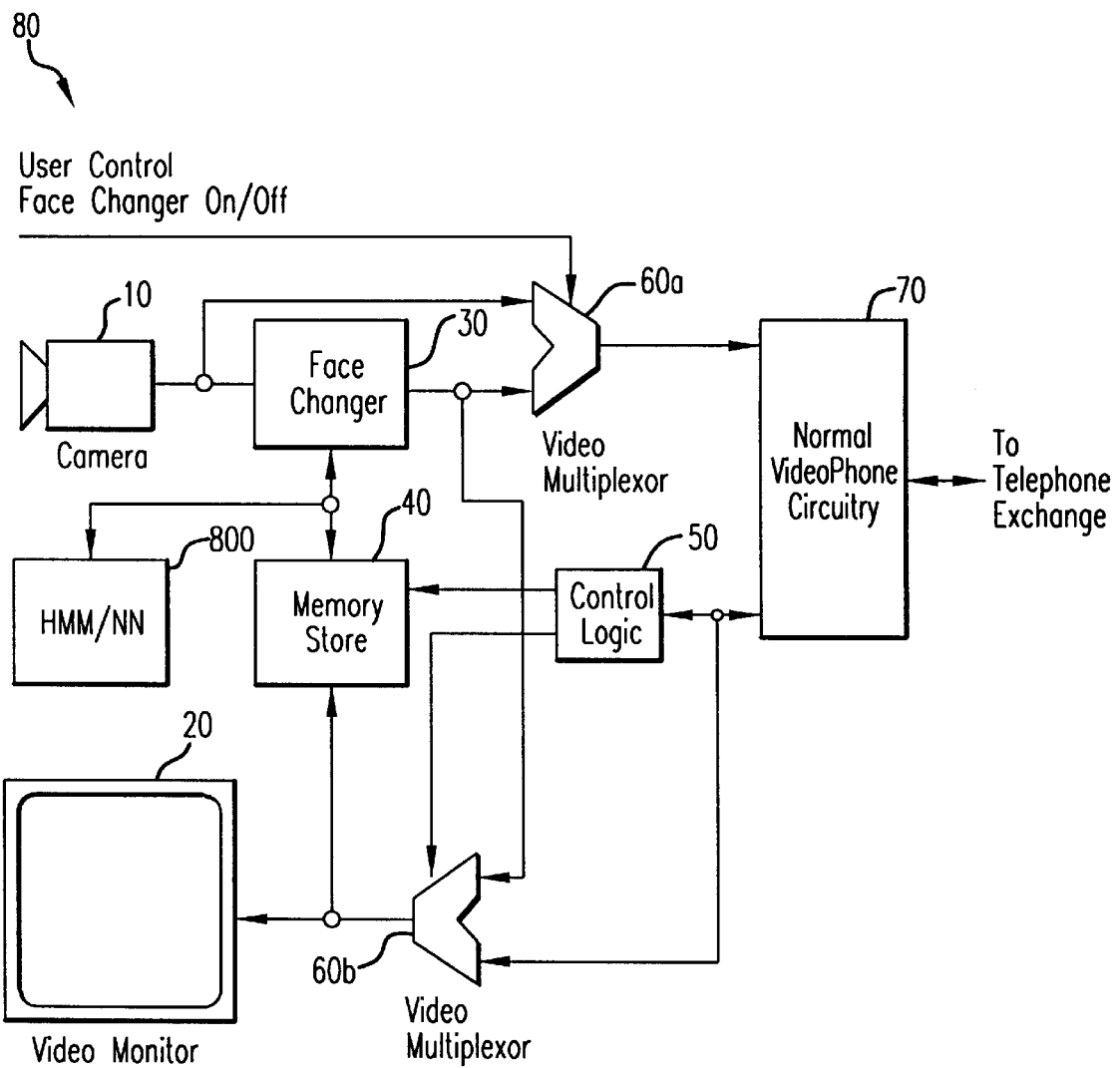
FIG. 8 is a schematic representation of an alternative construction of the image processing apparatus of the invention.

Referring now to FIG. 8, an alternative construction of apparatus indicated generally by the numeral 80 is illustrated in FIG. 8. The apparatus 80 differs from the apparatus 1 in that it comprises an additional device 800 the purpose of which is to analyze the output from the face changer 30 and provide additional information to the memory store 40, whose purpose is to provide the substitute image. The device 800 can be implemented as a neural network or Hidden Markov Model and has two phases of operation, namely training and recall. In the training phase, the device 800 uses data derived from the face changer 30 and external guidance to map the input images from the camera 20 to outputs which represents the probability of the input images belonging to a specified set of expressions such as smile, frown etc. One output represents one particular expression. In the second phase of operation, recall, the real-time parameters are fed into the device 800 from the face changer 30 and the most likely expression which the input image represents is evaluated. This information, together with the parameters from the face changer 30 are inputted to the memory store 40 which uses the information to construct the appropriate output image.

The invention is not limited to the particular embodiments described. For example, it is envisaged that the output image memory may be modified using different control circuitry or possibly in software alone. Further, the feature extraction tracking signal may be generated by processing RGB signals in any of the relevant prior art methods.

The apparatus may comprise only the facial part detection circuit 31 to generate a feature extraction tracking signal for any other use. The output tracking signals are very comprehensive—including location data in terms of regions of pixels rather than edges. Possible alternative applications of this data include capture of expressions, sign language communication, videophone communication, computer animation, both in single frame or real time video acquisition.

We claim:

1. An image processing method comprising the steps of receiving a subject facial image signal, generating a feature extraction tracking signal, and processing said tracking signal to provide a processed output signal, wherein:

said processing step comprises the sub-steps of:
      generating an image signal representing a substitute face; and
      modifying said substitute face image signal in real time according to the tracking signal to generate an output signal representing the substitute face with facial features of the subject face by converting the tracking signal to a facial characteristic signal representing positional characteristics of facial features, the facial characteristic signal being a vector signal wherein pixel change data in an update image memory is selected by comparison of current and previous characteristics signals.

2. A method as claimed in 1 wherein the output signal is transmitted from an output image memory which is modified by overwriting pixel values transferred from an update image memory in response to the tracking signal, the update image memory storing pixel changes between frames the update transfers being controlled by reference to a lookup table having pointers to addresses in the update image memory.

3. A method as claimed in claim 1 wherein th facial characteristic signal is a vector signal.

4. A method as claimed in claim 1, wherein the facial characteristic signal is a vector signal and wherein the previous characteristic signal is stored in a dedicated register.

5. A method as claimed in claim 2, wherein the update image memory stores data elements in three fields, namely an indicator of the position of the element, a second field having an address for a location in the output image memory and a third field having a color value for the pixel.

6. A method as claimed in claim 1, wherein the step of generating the substitute face image signal comprises the steps of retrieving from an image memory a primeval image and subsequently updating said image according to the tracking signal.

7. A method as claimed in claim 6, wherein the primeval image is transferred from a primeval image memory to the output image memory upon initialization.

8. A method as claimed in claim 1, wherein the tracking signal is generated by:
   generating a subject facial image signal in H,S,V format;
   passing at least two components of said H,S,V format signal through a band pass filter;
   mapping the filter output signals over the subject facial image pixel area; and
   determining feature locations within the pixel area according to the mapping of the filter output signals.

9. A method as claimed in claim 8, wherein the step of determining feature locations comprises the sub-steps of detecting the facial area and subsequently detecting mouth and eye areas within the detected facial area.

10. A method as claimed in claim 8, wherein the step of determining feature locations comprises the sub-steps of detecting the facial area and subsequently detecting mouth and eye areas within the detected facial area, and wherein only the H and S components of the subject facial image signal are processed for facial area detection.

11. A method as claimed in claim 12, wherein the step of determining feature locations comprises the sub-steps of detecting the facial area and subsequently detecting mouth and eye areas within the detected facial area, and wherein only the H and S components of the subject facial image signal are processed for facial area detection, and said processing comprises band pass filtering followed by mapping the filter output over the pixel area.

12. A method as claimed in claim 8, wherein the step of determining feature locations comprises the sub-steps of detecting the facial area and subsequently detecting mouth and eye areas within the detected facial area, and mouth detection is achieved by processing the S and V components of the subject image signal within the detected facial area.

13. A method as claimed in claim 8, wherein the step of determining feature locations comprises the sub-steps of detecting the facial area and subsequently detecting mouth and eye areas within the detected facial area, and wherein only the V component of the subject image signal is processed for eye detection.

14. A method as claimed in claim 8, wherein the step of determining feature locations comprises the sub-steps of detecting the facial area and subsequently detecting mouth and eye areas within the detected facial area, and only the V component of the subject image signal is processed for eye detection, and wherein the V component is normalized and eye detection is achieved by correlation.

15. An image processing method comprising the steps of:
receiving a subject facial image signal;
extracting features in the signal to generate a tracking signal;
transforming the tracking signal to a facial characteristic signal representing positional characteristics of features of the subject face;
writing a primeval substitute image to an output image memory; and
modifying the output image memory by overwriting pixel values transferred from an update image memory, the facial characteristic signal being a vector signal wherein pixel change data in said output image memory is selected by comparison of current and previous characteristics signals, said transfers being controlled in response to the facial characteristic signal.

16. An image processing apparatus comprising means for receiving a subject facial image signal, means for generating a feature extraction tracking signal, and means for processing said tracking signal to provide a processed output signal, said processing means comprising means for:
generating an image signal representing a substitute face; and
modifying said substitute face image signal in real time according to the tracking signal to generate an output signal representing the substitute face with facial features of the subject face by converting the tracking signal to a facial characteristic signal representing positional characteristics of facial features, the facial characteristic signal being a vector signal wherein pixel change data in an update image memory is selected by comparison of current and previous characteristic signals.

17. An image processing apparatus as claimed in claim 16, wherein said processing means comprises an output image memory, an update image memory and means for modifying said output image memory by transferring pixel values from the update image memory in response to the tracking signal.

18. An image processing apparatus as claimed in claim 17, wherein the update image memory stores pixel changes between frames.

19. An image processing apparatus as claimed in claim 16, wherein said processing means comprises means for converting the tracking signal to a facial characteristic signal representing positional characteristics of facial features.

20. An image processing apparatus as claimed in claim 19, wherein said facial characteristic signal is a vector signal.

21. An image processing apparatus as claimed in claim 16, wherein the processing means further comprises a neural network device for training during operation of the apparatus by monitoring feature data and for subsequently providing feedback to assist in recognition of features.

22. An image processing apparatus comprising:
means for receiving a subject facial image signal;
means for extracting features in the signal to generate a tracking signal; and
processing means comprising:
means for transforming the tracking signal to a facial characteristic signal representing positional characteristics of features of the subject face;
an output image memory;
means for writing a primeval substitute image to the output image memory;
an update image memory; and
means for modifying the output image memory by transferring pixel values from the update image memory to the output image memory in response to the facial characteristic signal.

23. An image processing method comprising the steps of receiving an input image signal and generating a feature extraction tracking signal, characterised in that:
the input image signal is in H,S,V format;
a facial area location signal is generated by passing at least part of the input image signal through a band pass filter and analyzing the output of the filter;
a mouth location signal is generated by passing at least part of the input image signal through a band pass filter and analyzing the output of the filter within the facial pixel area according to the facial area location signal;
eye location signals are generated by processing at least part of the input image signal within the facial pixel area according to the facial area location signal; and
the facial area location, mouth location and eye location signals are outputted as output tracking signals.

24. A method as claimed in claim 23, wherein only two of the H,S,V input image components are used for generation of the facial area location signal.

25. A method as claimed in claim 23, wherein the H and S components are passed through the band pass filter for generation of the facial area location signal.

26. A method as claimed in claim 23 wherein only two of the H,S,V input image components are used for generation of the mouth location signal.

27. A method as claimed in claim 26, wherein the S and V components are passed through the band pass filter for generation of the mouth area location signal.

28. A method as claimed in claim 23, wherein the band pass filter output signals are analyzed by mapping the output data over the pixel area and generating a projection in a mapping axis and analysing said projection.

29. A method as claimed in claim 28, wherein two projections are generated, one for each axis in a two-dimensional pixel area plane.

30. A method as claimed in claim 23, wherein each band pass filter comprises a look-up table containing filter indicators which are generated off-line.

31. A method as claimed in claim 28, wherein the step of analyzing the filter output signals comprises the further steps of determining maximum limits in the pixel area for a feature and generating a bounding box according to said limits.

32. A method as claimed in claim 23, wherein the image processing for generation of the eye area location signals comprises the steps of correlation with templates.

33. A method as claimed in claim 32, wherein the image signal is normalized before correlation.

34. A method as claimed in claim 32, wherein the V component only of the input image signal is used for generation of the eye location signals.

35. A method as claimed in claim 23, wherein the tracking signals which are generated are post-processed to generate a facial characteristic signal representing both location and positional characteristic data, said signal being generated by passing the tracking signals through logic devices.

36. An image processing apparatus comprising:
 means for receiving an input image signal in H,S,V format;
 a facial area band pass filter;
 means for passing at least part of the input image signal through the facial area band pass filter and analyzing the output of the filter to generate a facial area location signal;
 a mouth location band pass filter;
 means for passing at least part of the input image signal through the mouth location band pass filter and for analyzing the output of the filter within the face pixel area according to the facial area location signal;
 processing means for processing at least part of the input image signal within the facial pixel area according to the facial area location signal to generate eye location signals; and
 means for outputting said facial area location, mouth location, and eye location signals as output tracking signals.

37. An apparatus as claimed in claim 36, wherein only the H and S components of the input image signal are passed through the facial area band pass filter.

38. An apparatus as claimed in claim 36, wherein only the S and V components of the input image signal are passed through the mouth location band pass filter.

39. An apparatus as claimed in claim 36, further comprising post-processing logic devices comprising means for receiving the tracking signals and generating a facial characteristic signal representing both location and positional characteristic data.

* * * * *

UNITED STATES PATENT AND TRADEMARK OFFICE
CERTIFICATE OF CORRECTION

PATENT NO. : 5,870,138

DATED : 9 February 1999

INVENTOR(S) : Anthony SMITH et al.

It is certified that error appears in the above-identified patent and that said Letters Patent is hereby corrected as shown below:

| Column | Line | |
|--------|------|---|
| 7 | 7 | Change "Initialisation" to --Initialization--. |
| 18 | 23 | Change "in 1" to --in claim 1,--. |
| 18 | 31 | After "1" insert --,--; change "th" to --the--. |

Signed and Sealed this

Sixteenth Day of May, 2000

Q. TODD DICKINSON

Attest:

Attesting Officer

Director of Patents and Trademarks